(12) United States Patent
Van Camp

(10) Patent No.: US 8,914,783 B2
(45) Date of Patent: Dec. 16, 2014

(54) SOFTWARE DEPLOYMENT MANAGER INTEGRATION WITHIN A PROCESS CONTROL SYSTEM

(75) Inventor: Kim O Van Camp, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1035 days.

(21) Appl. No.: 12/323,057

(22) Filed: Nov. 25, 2008

(65) Prior Publication Data

US 2010/0131084 A1 May 27, 2010

(51) Int. Cl.
*G06F 9/45* (2006.01)
*G06F 9/445* (2006.01)

(52) U.S. Cl.
CPC .................................. *G06F 8/65* (2013.01)
USPC ............................ 717/168; 717/169; 717/173

(58) Field of Classification Search
None
See application file for complete search history.

(56) References Cited

U.S. PATENT DOCUMENTS

| | | | | |
|---|---|---|---|---|
| 5,826,080 | A * | 10/1998 | Dworzecki | 718/103 |
| 5,913,066 | A | 6/1999 | Benzenberg et al. | |
| 6,078,747 | A * | 6/2000 | Jewitt | 717/168 |
| 6,272,508 | B1 | 8/2001 | Dyne et al. | |
| 6,282,709 | B1 | 8/2001 | Reha et al. | |
| 6,397,385 | B1 | 5/2002 | Kravitz | |
| 6,457,076 | B1 | 9/2002 | Cheng et al. | |
| 6,557,054 | B2 | 4/2003 | Reisman | |
| 6,571,285 | B1 | 5/2003 | Groath et al. | |
| 6,633,782 | B1 | 10/2003 | Schleiss et al. | |
| 6,654,645 | B2 * | 11/2003 | Bermann et al. | 700/4 |
| 6,681,226 | B2 | 1/2004 | Bretl et al. | |
| 6,711,557 | B1 | 3/2004 | Palaniappan | |
| 6,732,358 | B1 | 5/2004 | Siefert | |
| 6,801,920 | B1 | 10/2004 | Wischinski | |
| 6,813,532 | B2 | 11/2004 | Eryurek et al. | |
| 6,931,328 | B2 * | 8/2005 | Braig et al. | 702/23 |
| 6,965,806 | B2 | 11/2005 | Eryurek et al. | |

(Continued)

FOREIGN PATENT DOCUMENTS

| | | |
|---|---|---|
| CN | 1525271 | 9/2004 |
| CN | 1859191 A | 11/2006 |

(Continued)

OTHER PUBLICATIONS

Liba, "Computer Performance Measurement and Evaluation Methods: Analysis and Applications"; 1978 MIT press; [retrieved on Nov. 15, 2013]; Retrieved from eDan (NPL of U.S. Appl. No. 11/567,450); pp. 14-15, 20-23, 74-77, 114-117.*

(Continued)

*Primary Examiner* — Xi D Chen
(74) *Attorney, Agent, or Firm* — Hanley, Flight & Zimmmeran, LLC

(57) ABSTRACT

Example systems and methods to maintain process control systems are disclosed. A disclosed example method involves identifying at least one of an update or an upgrade applicable to a configuration of nodes of a process control system. Software is provided for download to the process control system. The software represents an update and/or upgrade. Metadata for the software indicating applicability of the software to one or more nodes of the process control system is also provided for download. Automated installation of the software to one or more nodes of the process control system is facilitated based on the metadata from a workstation in communication with the one or more nodes of the process control system.

45 Claims, 12 Drawing Sheets

(56) References Cited

U.S. PATENT DOCUMENTS

| | | | |
|---|---|---|---|
| 6,973,479 B2 | 12/2005 | Brady, Jr. et al. | |
| 6,985,779 B2 | 1/2006 | Hsiung et al. | |
| 6,990,660 B2* | 1/2006 | Moshir et al. | 717/171 |
| 6,996,818 B2 | 2/2006 | Jacobi et al. | |
| 7,020,875 B2 | 3/2006 | Zweifel et al. | |
| 7,080,371 B1 | 7/2006 | Arnaiz et al. | |
| 7,093,246 B2* | 8/2006 | Brown et al. | 717/173 |
| 7,120,391 B2* | 10/2006 | Stengele et al. | 455/41.3 |
| 7,130,701 B1 | 10/2006 | Wischinski | |
| 7,178,056 B2 | 2/2007 | Shanbhogue | |
| 7,203,560 B1 | 4/2007 | Wylie et al. | |
| 7,239,977 B2 | 7/2007 | Fantana et al. | |
| 7,328,078 B2 | 2/2008 | Sanford et al. | |
| 7,346,404 B2 | 3/2008 | Eryurek et al. | |
| 7,386,845 B1* | 6/2008 | Fox et al. | 717/169 |
| 7,496,910 B2* | 2/2009 | Voskuil | 717/168 |
| 7,516,450 B2* | 4/2009 | Ogura | 717/168 |
| 7,539,686 B2 | 5/2009 | Shepard et al. | |
| 7,546,594 B2* | 6/2009 | McGuire et al. | 717/168 |
| 7,555,749 B2* | 6/2009 | Wickham et al. | 717/168 |
| 7,644,404 B2* | 1/2010 | Rao et al. | 717/169 |
| 7,698,242 B2 | 4/2010 | Van Camp et al. | |
| 7,747,995 B2* | 6/2010 | Fritsch et al. | 717/168 |
| 7,747,997 B1* | 6/2010 | Rao | 717/169 |
| 7,784,044 B2* | 8/2010 | Buban et al. | 717/168 |
| 7,814,476 B2* | 10/2010 | Ho | 717/169 |
| 7,814,480 B2* | 10/2010 | Sakuda et al. | 717/173 |
| 7,818,405 B2* | 10/2010 | Appaji | 709/221 |
| 7,831,412 B1* | 11/2010 | Sobel et al. | 702/186 |
| 7,844,766 B1* | 11/2010 | Straitiff | 717/173 |
| 7,865,889 B1* | 1/2011 | Bird et al. | 717/168 |
| 7,895,592 B2* | 2/2011 | Subramanian et al. | 717/168 |
| 7,966,278 B1* | 6/2011 | Satish | 706/52 |
| 8,051,414 B2* | 11/2011 | Stender et al. | 717/168 |
| 8,171,547 B2* | 5/2012 | Thorley et al. | 717/168 |
| 8,176,483 B2* | 5/2012 | Hoefler et al. | 717/168 |
| 8,473,940 B2* | 6/2013 | Ikeda | 717/173 |
| 8,490,075 B2* | 7/2013 | Waris et al. | 717/169 |
| 8,516,582 B2* | 8/2013 | Thorley et al. | 717/169 |
| 8,527,977 B1* | 9/2013 | Cheng et al. | 717/168 |
| 8,549,509 B2* | 10/2013 | Isom | 717/168 |
| 8,665,466 B2* | 3/2014 | Akiyoshi | 717/168 |
| 2002/0046221 A1 | 4/2002 | Louis Wallace et al. | |
| 2002/0095230 A1 | 7/2002 | Bergo et al. | |
| 2002/0163427 A1 | 11/2002 | Eryurek et al. | |
| 2002/0174264 A1 | 11/2002 | Fuller et al. | |
| 2003/0046675 A1* | 3/2003 | Cheng et al. | 717/173 |
| 2003/0046676 A1* | 3/2003 | Cheng et al. | 717/173 |
| 2003/0182652 A1 | 9/2003 | Custodio | |
| 2003/0200541 A1* | 10/2003 | Cheng et al. | 717/169 |
| 2004/0088698 A1* | 5/2004 | Claiborne | 717/174 |
| 2004/0088699 A1* | 5/2004 | Suresh | 717/168 |
| 2004/0153412 A1 | 8/2004 | Fischer et al. | |
| 2004/0186927 A1 | 9/2004 | Eryurek et al. | |
| 2004/0187103 A1* | 9/2004 | Wickham et al. | 717/168 |
| 2004/0213384 A1 | 10/2004 | Alles et al. | |
| 2004/0230828 A1* | 11/2004 | DeFuria et al. | 713/200 |
| 2005/0010323 A1 | 1/2005 | Cocciadiferro et al. | |
| 2005/0033866 A1 | 2/2005 | Besson et al. | |
| 2005/0071838 A1 | 3/2005 | Hatasaki | |
| 2005/0132349 A1 | 6/2005 | Roberts et al. | |
| 2005/0228798 A1 | 10/2005 | Shepard et al. | |
| 2005/0273779 A1* | 12/2005 | Cheng et al. | 717/168 |
| 2006/0015862 A1* | 1/2006 | Odom et al. | 717/168 |
| 2006/0101457 A1 | 5/2006 | Zweifel et al. | |
| 2006/0184927 A1* | 8/2006 | Deblaquiere et al. | 717/168 |
| 2006/0195839 A1 | 8/2006 | Lin et al. | |
| 2007/0143450 A1 | 6/2007 | Kruse et al. | |
| 2007/0168919 A1* | 7/2007 | Henseler et al. | 717/101 |
| 2007/0169079 A1 | 7/2007 | Keller et al. | |
| 2007/0244584 A1 | 10/2007 | John et al. | |
| 2008/0189693 A1 | 8/2008 | Pathak | |
| 2008/0208365 A1 | 8/2008 | Grgic et al. | |
| 2008/0271012 A1 | 10/2008 | Eykholt | |
| 2008/0288933 A1* | 11/2008 | Budmiger et al. | 717/168 |
| 2008/0288936 A1* | 11/2008 | Ikeda | 717/173 |
| 2010/0131939 A1 | 5/2010 | Hieb et al. | |
| 2013/0042230 A1* | 2/2013 | Little et al. | 717/173 |
| 2014/0109079 A1* | 4/2014 | Cheng et al. | 717/173 |

FOREIGN PATENT DOCUMENTS

| | | |
|---|---|---|
| DE | 19701322 | 7/1998 |
| EP | 1001336 | 5/2000 |
| EP | 2189899 | 5/2010 |
| JP | H06295236 | 10/1994 |
| JP | 8123534 | 5/1996 |
| JP | 2002091956 | 3/2002 |
| JP | 2002373079 | 12/2002 |
| JP | 2004164075 | 6/2004 |
| JP | 2004265304 | 9/2004 |
| JP | 2004295299 | 10/2004 |
| JP | 2005073034 | 3/2005 |
| JP | 2005259115 | 9/2005 |
| JP | 2007235559 | 9/2007 |
| JP | 2008205075 | 9/2008 |
| WO | 0180023 | 10/2001 |
| WO | 02079884 | 10/2002 |
| WO | 03075206 | 9/2003 |
| WO | 2004092982 | 10/2004 |
| WO | 2005033934 | 4/2005 |
| WO | 2005033934 A2 | 4/2005 |

OTHER PUBLICATIONS

Krishnamurthy, et al., "Data Tragging Architecture for System Monitoring in Dynamic Enviroments"; 2008 IEEE; [retrieved on Mar. 19, 2014]; Retrieved from Internet <URL: http://ieeexplore.ieee.org/stamp/stamp.jsp?tp=&arnumber=4575160>;pp. 390-397.*

Parlavantzas, et al., "Design Support for Componentising and Grid-enabling Scientific Applications"; 2007 ACM; [retrieved on Mar. 19, 2014]; Retrieved from Internet <URL: http://dl.acm.org/citation.cfm?id=1297385>;pp. 31-38.*

Roehm, et al., "Towards Identification of Software Improvements and Specificaiton Updates by Comparing Monitored and Specified End-User Behavior"; 2013 IEEE; [retrieved on Mar. 19, 2014]; Retrieved from Internet <URL: http://ieeexplore.ieee.org/stamp/stamp.jsp?tp=&arnumber=6676933>;pp. 464-467.*

Shen, et a., "Reference-Driven Performance Anomaly Identification"; 2009 ACM;[retrieved on Mar. 19, 2014]; Retrieved from Internet <URL: http://dl.acm.org/citation.cfm?id=1555349>;pp. 85-96.*

Heiser, et al., "Twoards Trustworthy Computing Systems: Taking Microkernels to the Next Level"; 2007 ACM; [retrieved on Aug. 26, 2014]; Retrieved from Internet <URL:http://dl.acm.org/citation.cfm?id=1278901>; pp. 3-11.*

Meyer, Rakotonirainy, "A Survey of Research on Context-Aware Homes"; 2003, Australian Computer Society, Inc.; [retrieved on Aug. 26, 2014]; Retrieved from Internet <URL:http://dl.acm.org/citation.cfm?id=827987>; pp. 1-10.*

Tambe, et al., "Upgrading outdated rectifier control systems—needs and challenges"; 2006 IEE; [retrieved on Aug. 26, 2014]; Retrieved from Internet <URL:http://ieeexplore.ieee.org/stamp/stamp.jsp?tp=&arnumber=4199064>; pp. 1-5.*

John, et al., "Performance Improvement of Wireless Network Based on Effective Data Transmission"; 2008 IET; [retrieved on Aug. 26, 2014]; Retrieved from Internet <URL:http://ieeexplore.ieee.org/stamp/stamp.jsp?tp=&arnumber=4470093>; pp. 134-137.*

Search Report, issued by the UK Patent Office on Mar. 11, 2010, in connection with Great Britain Application No. 0920635.0, 5 pages.

Search Report, issued by the European Patent Office on Jan. 8, 2010, in connection with European Application No. 09176848, 7 pages.

Intellectual Property Office, Examination Report issued in Great Britain Patent Application No. GB0920635.0, dated Aug. 13, 2012, 2 pages.

Intellectual Ptoperty Office of Great Britain, Examination Report issued in connection with GB Patent Application No. 0920635.0, dated May 23, 2012, 3 pages.

(56) References Cited

OTHER PUBLICATIONS

State Intellectual Property Office of P.R. China, "The Notification of the First Office Action," issued in connection with Application No. 200910220995.1, Apr. 19, 2013, 14 pages.
European Patent Office, "Examination Report", issued in connection with European Application No. 09176848 issued on Dec. 5, 2013, 4 pages.
State Intellectual Property Office of the People'S Republic of China, "The Notification of the Second Office Action," issued in connection with Chinese Patent Application No. 200910220995.1, Dec. 30, 2013, 11 pages.
Japan Patent Office, "Notice of Reasons for Rejection," issued in connection with application No. JP P2009-267638 on Nov. 28, 2013, 7 pages.
United States Patent and Trademark Office, "Notice of Allowance," mailed on May 23, 2014, in connection with U.S. Appl. No. 12/323,007, 28 pages.
Great Britain Intellectual Property Office, "Search Report Under Section 17(5)," issued on Nov. 8, 2007, in connection with GB Patent Application No. GB0715422.2, 3 pages.
Japanese Patent Office, "Notice of Reasons for Rejection," issued on Nov. 29, 2013, in connection with Japanese Patent Application No. 2009-257028, 1 page.
State Intellectual Property Office of the People's Republic of China, "The Notification of Second Office Action," issued on Dec. 10, 2013 in connection with Chinese Patent Application No. 200910220996.6, 30 pages.
State Intellectual Property Office of the People's Republic of China, "The Notification of the First Office Action," issued on Apr. 2, 2013, in connection with Chinese Patent Application No. 200910220996.6, 13 pages.
Great Britain Intellectual Property Office, "Examination Report under Section 18(3)," issued on Jan. 3, 2013, in connection with GB Patent Application No. GB0919725.2, 3 pages.
Great Britain Intellectual Property Office, "Examination Report under Section 18(3)," issued on May 18, 2012, in connection with GB Patent Application No. GB0919725.2, 3 pages.
Great Britain Intellectual Property Office, "Search Report under Section 17(5)," issued on Mar. 4, 2010, in connection with GB Patent Application No. GB0919725.2, 3 pages.
European Patent Office, "Extended European Search Report," issued on Mar. 22, 2010, in connection with European Patent Application No. 09176835.8, 7 pages.
European Patent Office, "Communication Pursuant to Article 94(3) EPC," issued on Jan. 25, 2011, in connection with European Patent Application No. 09176835.8, 5 pages.
United States Patent and Trademark Office, "Office Action," mailed on Jun. 15, 2009, in connection with U.S. Appl. No. 11/465,036, 26 pages.
United States Patent and Trademark Office, "Notice of Allowance," mailed on Nov. 19, 2009, in connection with U.S. Appl. No. 11/465,036, 29 pages.
United States Patent and Trademark Office, "Supplemental Notice of Allowability," mailed on Jan. 8, 2010, in connection with U.S. Appl. No. 11/465,036, 8 pages.
United States Patent and Trademark Office, "Final Office Action," mailed on Feb. 7, 2013, in connection with U.S. Appl. No. 12/323,007, 19 pages.
United States Patent and Trademark Office, "Office Action," mailed on Jun. 22, 2012, in connection with U.S. Appl. No. 12/323,007, 19 pages.

* cited by examiner

FIG. 8

| Node | Time | Update | Action/Result | By | Dismissal/Note | Reactiv |
|---|---|---|---|---|---|---|
| WS_Maint-01 | 01MAR08 11:10:00 | MS08-012 | Download requested | Schedule | | |
| WS_Maint-01 | 01MAR08 11:10:00 | MS08-013 | Download requested | Schedule | | |
| WS_Maint-01 | 02MAR08 00:01:13 | MS08-012 | Download confirmed | Device | | |
| WS_Maint-01 | 02MAR08 00:01:17 | MS08-013 | Download confirmed | Device | | |
| WS_Maint-01 | 02MAR08 09:06:20 | DeltaV_11_1221 | Dismissed | J. Doe | Will do in turn... | 01Jun0 |
| WS_Maint-01 | 02MAR08 11:20:07 | DeltaV_11_82100 | Download requested | J. Doe | | |
| WS_Maint-01 | 02MAR08 11:20:07 | DeltaV_11_82100 | Install requested | J. Doe | | |
| WS_Maint-01 | 02MAR08 11:20:07 | MS08-012 | Install requested | J. Doe | | |
| WS_Maint-01 | 02MAR08 11:20:07 | MS08-013 | Install requested | J. Doe | | |
| WS_Maint-01 | 02MAR08 11:22:11 | DeltaV_11_82100 | Download confirmed | Device | | |
| WS_Maint-01 | 02MAR08 11:30:22 | MS08-012 | Install confirmed | Device | | |
| WS_Maint-01 | 02MAR08 11:41:03 | MS08-012 | Install confirmed | Device | | |
| WS_Maint-01 | 02MAR08 11:43:42 | MS08-013 | Install confirmed | Device | | |

DeltaV Software Deployment Manager

Software Update History

Nodes With Update History:
- Workstations
  - APS-01
  - WS_OP-01
  - WS_OP-02
  - WS Maint-01
  - Controllers and IO

SOFTWARE DEPLOYMENT MANAGER INTEGRATION WITHIN A PROCESS CONTROL SYSTEM

FIELD OF THE DISCLOSURE

The present disclosure relates generally to process control systems and, more particularly, to systems and methods to update and manage software in process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, device controllers, valves, valve positioners, switches and transmitters (e.g., temperature, pressure and flow rate sensors), perform functions within the process control system such as opening or closing valves and measuring process parameters. A central process controller receives signals indicative of process measurements made by the field devices and/or other information pertaining to the field devices, uses this information to implement a control routine and then generates control signals that are sent over the buses or other communication lines to the field devices to control the operation of the process control system.

A company may operate several process plants, each having one or more process control systems having different configurations. Performing hardware and software maintenance on such systems can be an arduous task. Because the process control systems may be located at different plant sites at different geographical locations, system engineers may be subject to frequent travel between each plant site. Alternatively, each plant site may have system engineers responsible for maintaining the hardware and software associated with the components of a process control system. In any case, maintaining a company's process control systems often involves numerous different maintenance procedures.

Maintaining a company's process control systems often involves installation and/or updating of software running on components of the process control systems. Owners of process controls systems often waste valuable time using undocumented, locally created methods to install patches specified by a system supplier. A user must download updates from an external system, and this process involves much time and expense. The customer must also determine which updates (e.g., security updates, etc.) to install. For many known systems, software update notices are currently sent to customers, and the customers manually update their control system controllers, workstations, etc., one at a time.

SUMMARY

Example systems and methods to update and maintain process control systems are described. In accordance with an example, a method for deployment and management of software updates and upgrades for nodes of a process control system involves identifying at least one of an update or an upgrade applicable to a configuration of nodes of the process control system. Software is provided for download to the process control system. The software represents an update and/or upgrade. Metadata for the software indicating applicability of the software to one or more nodes of the process control system is also provided for download. Automated installation of the software to one or more nodes of the process control system is facilitated based on the metadata from a workstation in communication with the one or more nodes of the process control system.

In accordance with an example, an apparatus for deploying updates and upgrade to nodes in a process control system includes a service management system providing at least one of an update or an upgrade for one or more nodes in the process control system using a software delivery service to provide software and supporting information for the at least one of an update or an upgrade to a user-specified destination in the process control system without user initiation. The service management system identifies the at least one of an update or an upgrade based on a configuration of the process control system. The apparatus also includes a software deployment manager at the user-specified destination in the process control system. The software deployment manager includes a degree of automation configurable by a user. The software deployment manager downloads and installs the software from the software delivery service to the one or more nodes in the process control system based on the supporting information and the configuration of the process control system.

In accordance with an example, a machine accessible medium has instructions stored thereon that, when executed, cause a machine to identify at least one of an update or an upgrade applicable to a configuration of nodes of a process control system. The instructions, when executed, cause a machine to provide, for download to the process control system, software for the at least one of an update or an upgrade and metadata for the software indicating applicability of the software to one or more nodes of the process control system. The instructions, when executed, cause a machine to facilitate automated installation of the software to one or more nodes of the process control system based on the metadata from a workstation in communication with the one or more nodes of the process control system.

In accordance with an example, a method involves rendering a first display area via a graphical user interface to display one or more pending software updates and upgrades for one or more nodes of a process control system. The one or more pending software updates and upgrades are automatically received from a software delivery service based on a configuration of the process control system. User input is accepted to configure one or more groups of nodes for the process control system. User input is accepted to approve action regarding the one or more pending software updates and upgrades. Download and installation of the one or more pending software updates and upgrades is facilitated according to the user input and the configuration of the process control system.

BRIEF DESCRIPTION OF THE DRAWINGS

FIG. 8 is a graphical user interface showing a history of software updates for user review.

DETAILED DESCRIPTION

Figure 1:
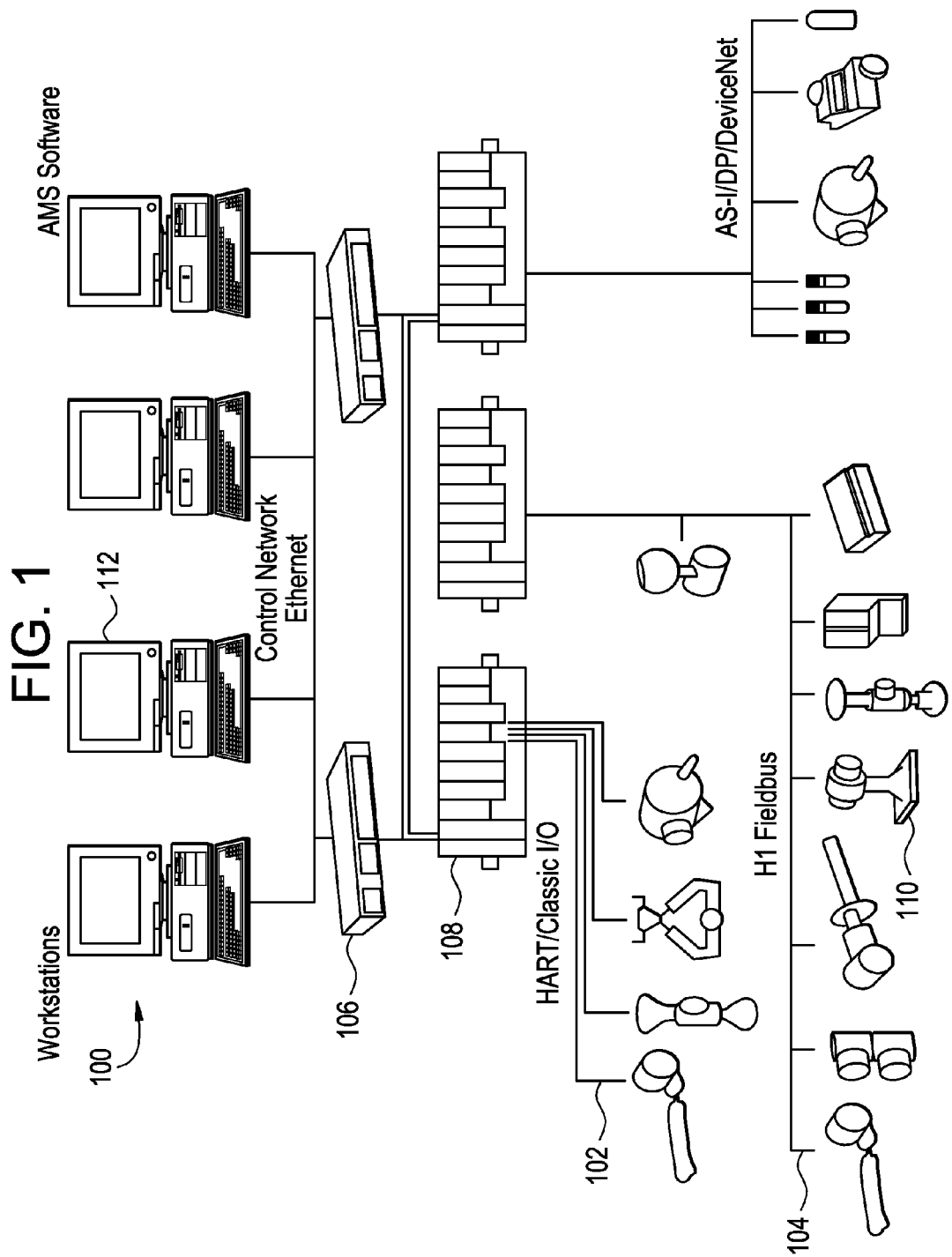
FIG. 1 illustrates an example process control system.

Although the following describes example systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example systems, persons of ordinary skill in the art will readily appreciate that the examples provided are not the only way to implement such systems.

Unlike known techniques for maintaining process control systems that involve using manual maintenance techniques to install or update software on the systems, the example methods and systems described herein may be used to implement an automated update and maintenance deployment tool that can be built into, integrated within, or implemented with a control system. More specifically, an example deployment manager tool described herein monitors remotely-located and/or local process control systems and associated equipment and receives over a network, such as the Internet and/or a private network, update files and metadata to automatically deploy updates where identified, for example. In one example, updates appropriate to a makeup of each system are determined by a supplier so a user does not have to identify the relevant updates. This enables a vendor to push updates to the system so the user does not have to pull the updates onto the system. A deployment agent in the system is programmed to accept and accommodate updates that have service disruption or reboot behaviors and presents options to a customer for installation at the customer's convenience. More generally, the deployment manager described herein understands the configuration of the control system within which it is integrated and/or implemented and only delivers updates and upgrades that are needed or appropriate for that system configuration.

For example, software updates may include security updates, anti-virus software, digital automation system updates and/or upgrades, operating system updates, and the like. A vendor may push particular update(s) and inform a customer which update(s) should be installed rather than requiring the customer to perform his or her own analysis and manually pull or retrieve (e.g., download) the relevant update(s). In certain examples, software updating is automated using a network-connected deployment tool (such as a Web-accessible machine in a control system) to obtain a bundle of one or more updates for each customer. A customer may then access any workstation in the system and update the entire system and/or a particular portion of the system. Such flexibility in software updating helps to reduce the amount of time and labor needed to execute the updating and helps to prevent update errors and ensure that updates occur on a regular basis. Further, the automated updating provided by the examples described herein provides a more robust control system to users.

In an example, the deployment manager downloads and delivers files for updates and upgrades for control system components. Updates may correct or otherwise address bugs and other issues associated with current software, and upgrades may represent new software versions, for example. Upgrades typically involve a relatively large amount of program code representing a new software version, whereas an upgrade or patch, which corrects a particular problem and/or adds a particular feature to existing software, typically involves a relatively large amount of program code.

In an example, a user can configure a deployment manager to be as automated or as user-controlled as desired. A deployment interface enables a user to configure a degree of autonomy for deployment tasks related to different types and/or sources of data, for example. Automated download and automated installation can be provided, for example. A user can automate downloads but configure a manual installation or vice versa, for example. A user can also configure deployment options on a computer by computer basis, according to groups of computers, for an entire network, for an entire process control system, etc. As an example, a user can select a lead group of machines (e.g., controllers, workstations, etc.) to automatically install and test an upgrade and then later deploy the upgrade to a remaining group of machines after the user has been able to evaluate how the lead group of machines is functioning with the upgrade.

Certain examples described herein can be used to deploy routine updates to a control system, such as a DeltaV™ digital automation system provided by Emerson Process Management. Additionally or alternatively, certain examples described herein can be used to update a flash version of a controller or Input/Output ("I/O") card and/or to distribute a new version of digital automation software to the rest of a running system.

FIG. 1 illustrates an example process control system 100 usable in conjunction with the software deployment system described herein. The example system 100 employs a digital plant process control architecture that integrates a variety of smart plant capabilities including field bus (such as HART 102 and/or FOUNDATION™ fieldbus 104), high-speed discrete busses, embedded advanced control, and advanced unit and batch management, for example. Adaptive field integration provides an infrastructure for a variety of applications including device management for device re-ranging, configuration and diagnostics, for example.

The process control system 100 scales in size and/or functionality. The process control system 100 can provide plug-and-play OPC (open connectivity via open standards) and XML (extensible markup language) integration, fieldbus, batch control, and advanced control technologies, for example.

The process control system 100 can also provide varying levels of redundancy. For example, an operator can choose a level of redundancy for an application, including: 1) redundant network communications (for example, Ethernet); 2)

redundant controllers; 3) redundant power supplies; 4) redundant fieldbus interfaces and bus power; 5) redundant digital I/O; 6) redundant serial communications (for example, MODBUS, RS485, etc.); and 7) redundant workstations.

The process control system 100 can provide flexible, system-wide security management for all users including operators, engineers, technicians, and other automation users based on user login, keys control system functionality and/or span of operator control. Security settings may include: 1) an operating span of control by plant area; 2) alarm limits, turning parameters change privilege; and/or 3) security by both user and by physical location for example.

The process control system 100 can also accommodate an addition of system components including controllers 106, I/O devices 108, field devices 110, and workstations 112, for example, while the system is powered and running. Thus, an operator can expand and upgrade the process control system 100) on the fly.

The process control system 100 can also support a full range of analog, discrete, thermocouple, and resistance temperature detectors (RTDs) for existing field devices, for example. The process control system 100 can include one or more sensor busses supporting installation and operation of discrete devices, such as pushbuttons, on/off valves, and proximity switches, for example. The system 100 can include one or more device busses that connect motor starters, drives, and other more complex devices, for example. The fieldbus 104, such as a FOUNDATION fieldbus, delivers predictive alerts, millisecond data capture, validated data, field-based control, diagnostics, and asset information bi-directionally within the digital automation system to help predict maintenance problems before they occur.

Devices can be automatically recognized by the process control system 100 as they are added, for example. The process control system 100 can coordinate aspects of automation engineering including but not limited to control strategies, process graphics, history, events, change management, and bulk editing and data entry, for example. The process control system 100 can also be used to develop types of control including but not limited to logic, regulatory, sequential, and advanced control, for example. The process control system 100 can further include one or more libraries of pre-defined control strategies, stress-tested digital bus devices files, etc.

The process control system 100 can provide digital automation systems with validated data, displaying quality, status, and diagnostics from field devices. As an example, alarm management is built on EEMUA 191, developed by a consortium of leading process industry automation users and suppliers, and designed to eliminate nuisance alarms. In particular, the process control system 100 can support EEMUA 191 standards by allowing operator suppression of alarms; timestamp and history of suppressed alarms; removing suppressed alarms from alarm banner and alarm summary; and/or maintaining a suppressed alarm summary, for example.

The example methods and systems described herein involve using an example online maintenance system that is communicatively coupled to one or more remotely located process control systems and configured to monitor various aspects of the process control system to generate preventative and/or corrective maintenance information. For example, the example online maintenance system may be implemented using one or more maintenance servers at a central facility executing machine accessible instructions (e.g., computer code, software, etc.) that cause the maintenance servers to communicate via the Internet and/or other communication network(s) (e.g., a local area network ("LAN"), a wireless LAN ("WLAN"), a wide area network ("WAN"), etc.) with one or more remotely located process control system servers and that cause the maintenance servers to obtain process control system information (e.g., performance information, operating information, etc.) from the process control system servers.

The example online maintenance system described herein may analyze the process control system information to determine whether any preventative maintenance or corrective maintenance is available for any portion of the one or more process control systems. The process control system information may be indicative of various types of operating conditions of each process control system including, for example, the software and/or firmware executed by the equipment in each process control system, any equipment failures within the systems, operating efficiencies, part numbers and manufacturers of equipment used to implement the systems, and/or many other types of operating conditions. To detect whether maintenance procedures should be performed, in some example implementations, the example online maintenance system may compare at least some of the process control system information with knowledgebase articles ("KBA's") (e.g., maintenance database entries) that describe issues (e.g., software bugs, equipment failures, operating anomalies, etc.) and suggested workarounds, fixes, or other maintenance procedures associated with overcoming or remedying the issues.

The example online maintenance system may be implemented using a web-based interface such as, for example, a web-based portal. In some example implementations, users may access the example online maintenance systems via virtually any computer system having network access and capable of rendering web pages. In this manner, unlike traditional techniques used to maintain process control systems, users may access maintenance information and perform maintenance procedures when located remotely from a process control system (e.g., not within the plant or off the process control system premises).

The example online maintenance system may also be implemented to provide a plurality of other features. For example, the example online maintenance system may be configured to send alerts via e-mail, pager, mobile phone, landline phone, really simple syndication ("RSS"), etc. to users (e.g., system operators, system engineers, maintenance engineers, etc.) if one or more particular conditions are met (e.g., a failure condition, a change in software or hardware, availability of firmware updates or software upgrades, etc.). The example online maintenance system may also generate various maintenance reports, monitor the lifecycle status of portions of the process control systems, organize and track information (e.g., expiration dates) associated with product warranty and support services, store and display status of open maintenance tickets or maintenance calls, and other features described below.

Figure 2:
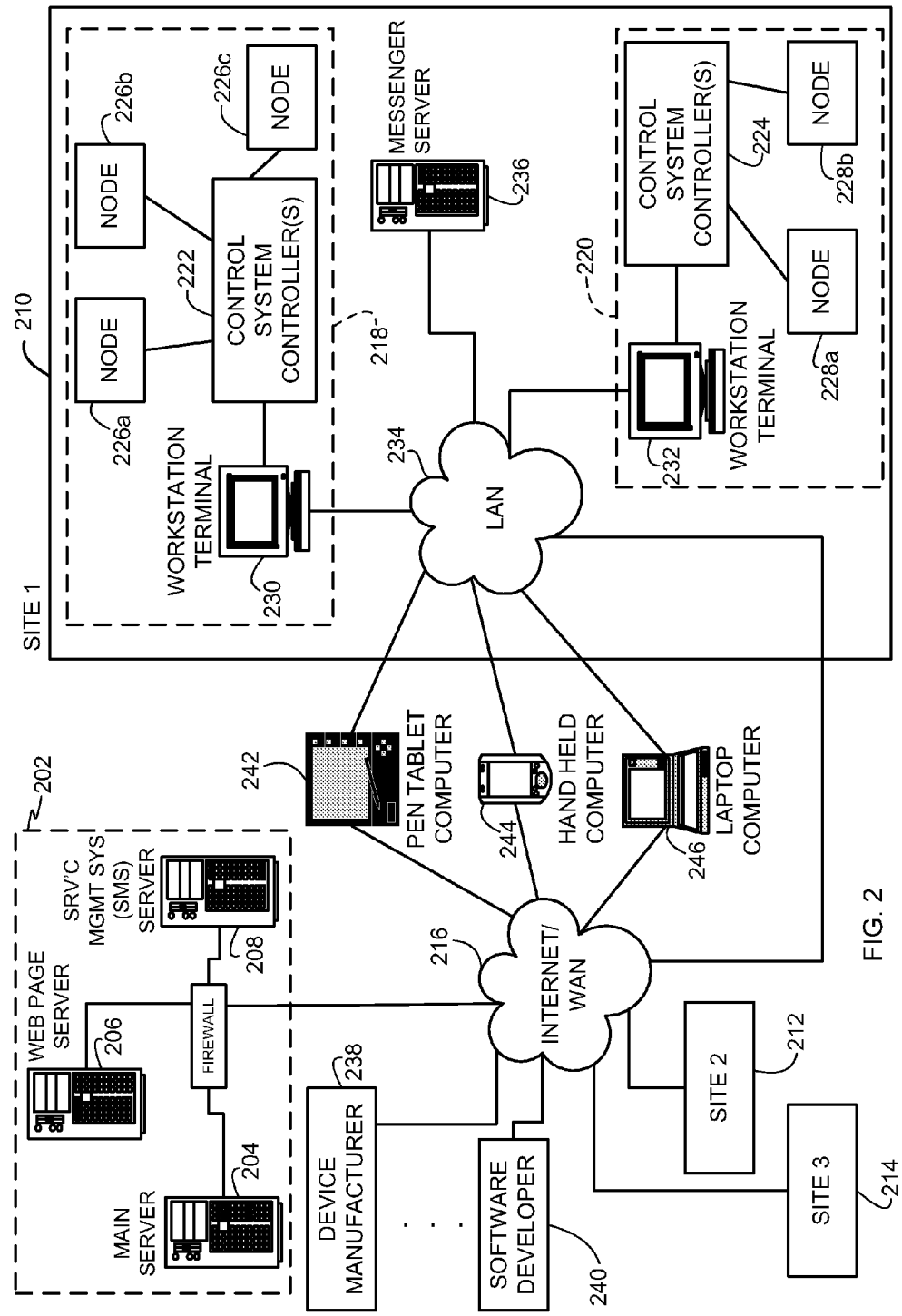
FIG. 2 is a block diagram illustrating an example online maintenance system communicatively coupled to a process control system.

Now turning to FIG. 2, an example online maintenance system 202 includes a main server 204, a web page server 206, and a service management system ("SMS") server 208. In alternative example implementations, the example online maintenance system 202 may include fewer or more servers than depicted in FIG. 2 to implement the example features, services, and capabilities of the example online maintenance system 202 described herein.

In the illustrated example, the main server 204 is configured to receive registration and/or configuration information associated with process control systems (e.g., example process control systems 218 and 220) monitored by the example online maintenance system 202. The registration and/or configuration information may include field device information, software information, firmware information, operational status information, maintenance information, lifecycle information, etc. associated with hardware, software, and/or firmware used to implement the components and devices of monitored process control systems 218 and 220. The main server 204 may receive the registration and/or configuration information during an enrollment process of a process control system (e.g., when a process control system is brought online for the first time to be monitored by the example online maintenance system 202). In addition, the main server 204 may receive new and/or updated registration and/or configuration information periodically and/or aperiodically after an enrollment process to ensure that the example online maintenance system 202 has the latest and up-to-date information corresponding to monitored process control systems.

The main server 204 is also configured to monitor process control systems. For example, the main server 204 may be provided with software that, when executed, causes the main server 204 to monitor field devices and/or other components or devices of monitored process control systems based on, for example, the registration and/or configuration information received from the process control systems.

In the illustrated example, the web page server 206 is configured to create and serve web pages to operators of monitored process control systems. In the illustrated example, the web page server 206 serves web pages including one or more graphical user interfaces ("GUI's"). The web pages may be used by operators to provide information to and retrieve information from the example online maintenance system 202. For example, the web pages served by the web page server 206 may be used to register a process control system with the example online maintenance system 202 and to provide registration and/or configuration information to the main server 204.

In the illustrated example, the main server 204 and the web page server 206 are implemented separately to enable taking the web page server 206 offline without compromising the monitoring processes and registration/configuration information receiving processes performed by the main server 204. For example, the web page server 206 may be taken offline to perform maintenance (e.g., to add or upgrade web page interfaces, update security software, etc.) while the main server 204 continues to monitor process control systems.

In the illustrated example, the SMS server 208 is configured to store and process the registration/configuration information corresponding to each process control system monitored by the example online maintenance system 202. For example, the SMS server 208 may include and/or be communicatively coupled to one or more data structures (e.g., databases) that store the registration/configuration information. The SMS server 208 may also be configured to store knowledge base articles ("KBA's") (e.g., maintenance database entries or other database entries that include maintenance information or other information about process systems and/or parts thereof) that describe issues (e.g., software bugs, equipment failures, operating anomalies, etc.) associated with different components or devices of process control systems. Typically, the KBA's also include suggested workarounds, fixes, or other maintenance procedures associated with overcoming or remedying the indicated issues. In the illustrated example, KBA's can be general type KBA's that are related to a process control system generally or KBA's can be specific device type KBA's that are related to specific parts (e.g., field devices, workstations, controllers, etc.) or portions (e.g., subsystems) of a process control system.

In the illustrated example, the SMS server 208 is configured to perform a KBA matching process. In general, the KBA matching process compares information stored in a KBA (e.g., identification information, device type information, or other criteria) to the registration/configuration information to determine which KBA's are applicable or relevant to which monitored process control systems.

The example online maintenance system 202 is communicatively coupled to a first site 210, a second site 212, and a third site 214 via the Internet (or other wide area network ("WAN")) 216. A WAN may be implemented using, for example, a telephone line, a digital subscriber line ("DSL"), an integrated services digital network ("ISDN"), a broadband cable system, a broadband alternating current ("AC") system, a satellite communication system, etc.

The sites 210, 212, and 214 may be part of a single enterprise (e.g., operated by the same business entity, company, corporation, etc.) and may include manufacturing sites, distribution sites, refinery sites, paper mills, or any other type of industrial or business site having operations associated with process control systems. While the first site 210 is illustrated in relatively more detail than the second and third sites 212 and 214, one or both of the second and third sites 212 and 214 may be implemented using configurations substantially similar or identical to (or different from) the illustrated configuration of the first site 210. In any case, the sites 210, 212, and 214 include one or more process control systems that are monitored and maintained using the example online maintenance system 202.

In the illustrated example, the first site 210 includes first and second distributed process control systems 218 and 220. The process control systems 218 and 220 may be used to perform substantially the same or different operations. For example, one of the process control systems 218 and 220 may be used to handle process fluids while the other may be used to operate a product manufacturing process. Of course, the process control systems 218 and 220 may be used to perform operations performed with any other type of process.

The first and second process control systems 218 and 220 include respective controllers 222 and 224, which are communicatively coupled to respective nodes 226a-c and 228a-b. At least some of the nodes 226a-c and 228a-b may include field devices such as, for example, device controllers, valves, valve positioners, switches, and/or transmitters (e.g., temperature, pressure, and flow rate sensors). The controllers 222 and 224 may be used to communicate configuration and control information to the nodes 226a-c and 228a-b and receive information from the nodes 226a-c and 228a-b including, for example, configuration information, control information, status information, measurement information, analysis information, etc. Although not shown, the process control systems 218 and 220 may include other process control system equipment including, for example, I/O modules, redundant equipment to provide fault tolerant features, wireless base stations for communicating with wireless field devices, etc., any of which may be represented by one of the nodes 226a-c and 228a-b.

The first and second process control systems 218 and 220 also include respective first and second workstation terminals 230 and 232, each of which is communicatively coupled to a respective one of the controllers 222 and 224. The workstation terminals 230 and 232 are communicatively coupled to a local area network ("LAN") 234, which is communicatively coupled to the Internet 216, and enables the process control systems 218 and 220 to communicate with the example online maintenance system 202. The LAN 234 may be implemented using a wired network (e.g., Ethernet, Token Ring, IEEE 1394, universal serial bus ("USB"), etc.) or a wireless network (e.g., IEEE 802.11 (Wi-Fi®), Bluetooth®, 900 MHz, etc.).

In some example implementations, to substantially reduce or eliminate compromising the security (e.g., data security, network security, etc.), integrity, etc. of the process control systems 218 and 220, some users may elect to not communicatively couple the process control systems 218 and 220 to the LAN 234 and/or may elect to restrict human access to the process control systems 218 and 220. In such a configuration, to communicate information about the process control systems 218 and 220 to the example online maintenance system 202, authorized users with physical access to one or both of the workstation terminals 230 and 232 may initiate processes in the workstation terminals 230 and 232 to collect and organize saved data (e.g., process control system information) intended for the example online maintenance system 202 using encrypted extensible markup language ("XML") files. The authorized user can then store the encrypted XML files on a portable machine readable medium (e.g., a CD-ROM, a USB memory stick, a magnetic disk, etc.) and physically transport the encrypted XML files from the workstation terminals 230 and 232 to a processor system (e.g., a pen tablet computer 242, a hand held computer 244, a laptop computer 246, or another workstation) communicatively coupled to the Internet 216. The user can then upload the encrypted XML files to the main server 204. The user may periodically or aperiodically repeat the process to update the process control system information stored at the example online maintenance system 202. This example implementation enables the example online maintenance system 202 to provide its services and respond in a timely fashion to changes in the process control systems 218 and 220. As a result, users are able to obtain the benefits of the services provided by the example online maintenance system 202 while ensuring information integrity and security of the process control systems 218 and 220.

The workstation terminals 230 and 232 may store application programs including machine accessible or readable instructions that, when executed, cause the workstation terminals 230 and 232 to exchange information with the controllers 222 and 224 and the example online maintenance system 202. The workstation terminals 230 and 232 may communicate with the controllers 222 and 224 to communicate configuration information and control information to field devices at the nodes 226a-c and 228a-b and receive measurement information, analysis information, operating condition information, status information, and other maintenance information (e.g., software version, hardware version, serial number, manufacturer, date of installation, last date of maintenance, etc.). The terminals 230 and 232 may communicate at least some of the information received from the controllers 222 and 224 and the nodes 226a-c and 228a-b to the example online maintenance system 202. In addition, the terminals 230 and 232 may receive maintenance information from the example online maintenance system 202 that pertains to the controllers 222 and 224, the nodes 226a-c and 228a-b and devices attached thereto, and any other equipment communicatively coupled to the terminals 230 and 232. In this manner, the terminals 230 and 232 may inform users (e.g., an operator, a system engineer, an administrator, etc.) when updates, upgrades, or other maintenance information (e.g., technical documentation, replacement device availabilities, etc.) are available.

The first site 210 also includes a messenger server 236 communicatively coupled to the LAN 234 and configured to communicate with the process control systems 218 and 220.

In the illustrated example, the messenger server 236 is configured to generate and/or track alarms and/or events associated with the process control systems 218 and 220. For example, the messenger server 236 may obtain alarms generated by the field device nodes 226a-c and 228a-b, the controllers 222 and 224, and/or the workstation terminals 230 and 232. In some example implementations, any of the equipment used to implement the process control systems 218 and 220 may be configured to generate alarms based on, for example, threshold measurement values, hours of operation, efficiency, or any other type of operating condition. Additionally or alternatively, the messenger server 236 may be configured to generate alarms based on operating condition information obtained from the process control systems 218 and 220. In any case, the messenger server 236 may store and track the status of the alarms in a data structure (e.g., a database) and generate reports based on the alarm information.

In the illustrated example, the messenger server 236 may also generate event information. Events may include, for example, equipment status changes (e.g., enabled, disabled, on/off, equipment error, etc.), operator changes, equipment configuration changes (e.g., new configuration downloaded to a field device). The messenger server 236 may store and track the status of the events in a data structure (e.g., a database) and generate reports based on the stored event information.

The example online maintenance system 202 may access the alarm and event information stored in the messenger server 236 and use the alarm and event information to determine whether maintenance may be required or whether any maintenance information (e.g., product documentation, bug reports, knowledgebase articles, product updates, etc.) may be available for any equipment in the process control systems 218 and 220.

A user may use the first and second workstation terminals 230 and 232 to access information obtained from the controllers 222 and 224, the example online maintenance system 202, and/or the messenger server 236. In an example implementation, the terminals 230 and 232 may execute dedicated client-side software applications that establish network connections with the example online maintenance system 202 to exchange maintenance information with the online maintenance system 202. Alternatively or additionally, the terminals 230 and 232 may execute web browsers to access web pages or web-based applications to access the example online maintenance system 202 and to perform substantially the same or similar operations as with a dedicated client-side software application. In any case, a user may use the dedicated client-side application or the web-based application to view, modify, and manage the maintenance information obtained from the controllers 222 and 224, the example online maintenance system 202, and the messenger server 236.

A user may perform maintenance related work via the terminals 230 and 232. For example, the user may instruct the terminals 230 and 232 and/or the example online maintenance system 202 to update or upgrade particular equipment (e.g., field devices, the controllers 222 and 224, etc.) with received software or firmware updates. Also, the user may view summary and detail information pertaining to open service calls associated with the process control systems 218 and 220. In some example implementations, the terminals 230 and 232 may also be configured to view, modify, and/or manage information associated with process control systems in the second and third sites 212 and 214.

The example online maintenance system 202 may obtain maintenance information such as software/firmware updates, replacement device availability, manuals, technical documentation, bug reports, etc. from software vendors and device manufacturers. In the illustrated example, a device manufacturer system 238 and a software vendor system 240 are communicatively coupled to the Internet 216 to provide hardware and software/firmware update information to the example online maintenance system 202. In this manner, the example online maintenance system 202 can select update information pertaining to control systems in each of the sites 210, 212 and 214 and forward the selected information to the respective sites 210, 212, and 214.

The example implementation of FIG. 2 also includes the pen tablet computer 242, the handheld computer 244, and the laptop computer 246, all of which may be communicatively coupled to the Internet 216 and/or the LAN 234 to communicate with the example online maintenance system 202, the process control systems 218 and 220, and the messenger server 236. Users may use one or more of the pen tablet computer 242, the handheld computer 244, the laptop computer 246, or any other computer (e.g., a desktop computer) coupled to the Internet 216 or the LAN 234 and remotely located from the site 210 to access maintenance information associated with the site 210 in a manner substantially similar to that described above in connection with the workstation terminals 230 and 232. For instance, the pen tablet computer 242, the handheld computer 244, and the laptop computer 246 may execute dedicated client-side applications and/or web-based applications (or web pages) to view, modify, and/or manage the maintenance information associated with the process control equipment at any of the sites 210, 212, or 214.

Figure 3:
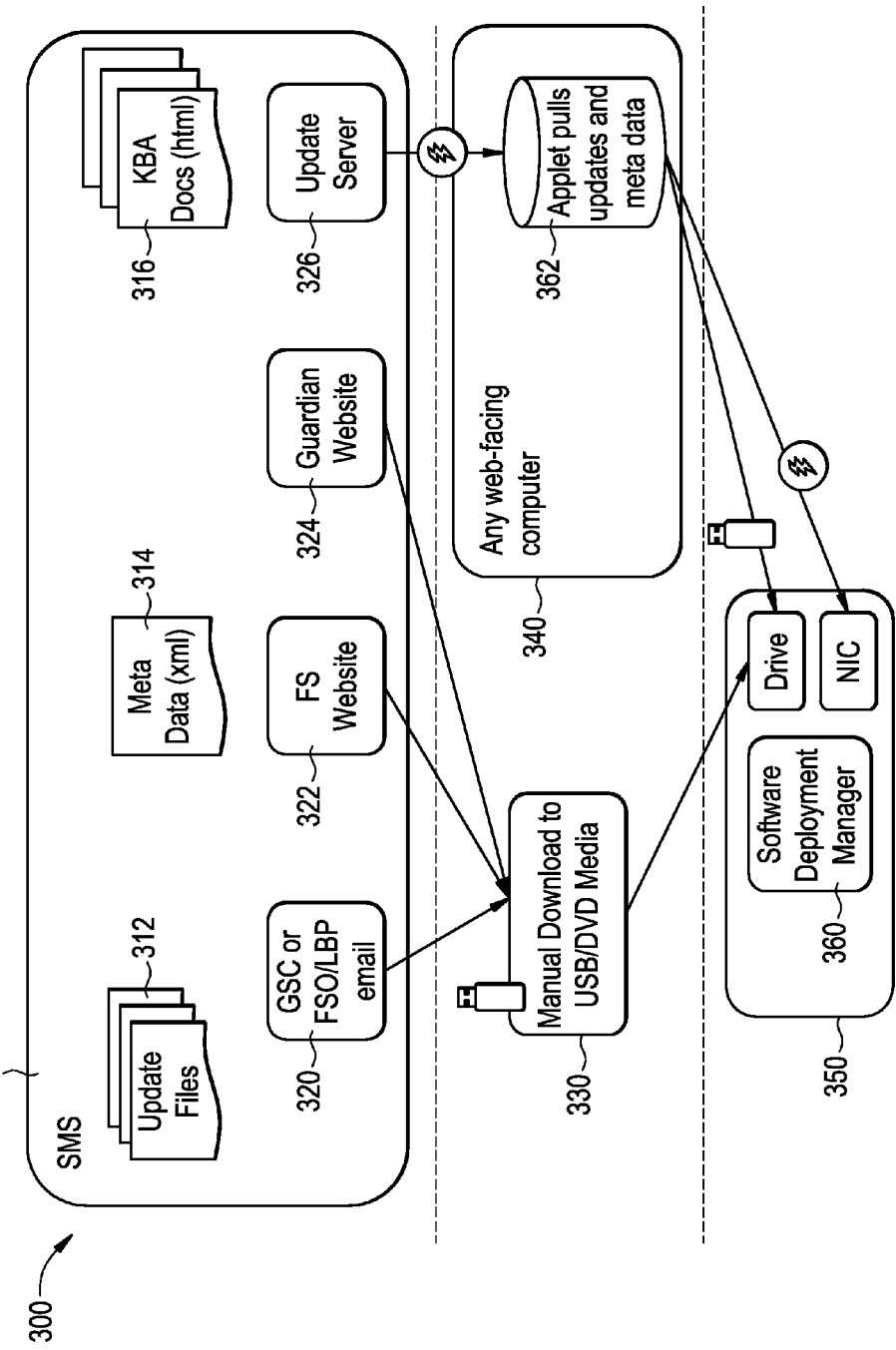
FIG. 3 is an example software deployment manager communicatively coupled to a process control system for software update and/or upgrade deployment and management.

A deployment manager may be used in conjunction with process control systems such as the example system described above with respect to FIG. 1, including control systems with online maintenance systems such as the example system described above with respect to FIG. 2. As shown in FIG. 3, an example deployment manager 300 uses update files, metadata, and/or knowledge base documents as a source of updates for components of a control system.

Using a service management system ("SMS") 310, updates and/or upgrades can be provided to customer computing devices including portable media 330, one or more non-process control computers 340, and/or one or more process control systems 350, for example. The SMS 310 includes a plurality of update/upgrade and/or other information components including update/upgrade files 312, metadata 314, KBA documents 316, etc. The SMS 310 also includes functionality such as an email server 320, one or more file system and/or update websites 322, 324, an update/upgrade server 326, etc.

The SMS 310 provides a software update delivery service such that, with no effort required on their part, users receive software files and supporting information to manage and install system software updates and/or upgrades. Software updates/upgrades are automatically electronically delivered to the user's specified destination, such as a computer 340, 350 and/or to a process or automation control system 350. Software updates/upgrades may be first delivered to the portable media 330 and/or the workstation 340 connected to but not a part of the process control system, which then deploy the updates/upgrades to the process control system 350, for example. Updates/upgrades can include process control system software, operating system software, anti-virus software, security software, etc. A software deployment manager 360 facilitates download, installation, configuration, and management of software deployment for the process control system 350.

Help files and/or other assistance may be provided for software updates and/or upgrades to assist the user with updates/upgrades for intended system nodes, including a reboot or service disruption, if applicable. The software update/upgrade files 312 and the metadata information 314 for installation can be automatically delivered to one or more computer or control system component. Software can also be manually delivered, for example. Files delivered may include process control system hot fixes, operating system and/or other application security updates, virus pattern updates, anti-virus engine updates, etc. Installation help may include related KBA document(s) 316; a target system's identification number, system name, and location; target nodes in the system; if a reboot is involved (e.g., yes or no); and if a service disruption is involved (e.g., yes or no) such as stopping an application in order to update it.

The SMS 310 provides one or more tables and related stored procedures to match process control system hot fixes to system nodes. Table(s) relate the KBAs 316, hot fixes, and control system software versions, for example. The SMS 310 stores the update and/or upgrade files 312, packages the files, creates help files, and transmits the files to a requesting applet at a customer site (e.g., the computer 340).

Via a website 322, 324, a dashboard tile, such as an "Automated Update Delivery" tile, may be provided with a link to download an applet that pulls files from a download server associated with the SMS 310, such as a file transfer protocol ("FTP") server and/or other server 320, 322, 324, 326 along with related instructions for installation and use, for example. In an example, no drill down page is involved in downloading via selection of the tile, but downloading is streamlined and automatic. In another example, no automated email message is provided, but the user can subscribe to existing notification messages for newly matched KBAs and security updates.

The dashboard tile may be limited in availability to a certain period of time within which a user may download updates/upgrades (e.g., 30 days) and/or may be displayed to the user as long as updates/upgrades are available for installation. The dashboard tile may be selectable in a support table and/or other location of a website or interface, such as an interface of the software deployment manager 360. In an example, once update/upgrades have been selected for installation, the tile may disappear from the user's view, but a delivery applet 362 may still check with the update server 326 for further updates and/or upgrades.

The delivery applet 362 attempts to retrieve new update/upgrade files periodically, for example (e.g., once every 6 hours). The delivery applet 362 may be installed on any computer or similar processing device 340, 350 with a network connection, such as a LAN, WAN, Internet, and/or other connection. As an example, the delivery applet 362 is designed for high cyber security with file encryption. The delivery applet 362 has a light footprint and may be installed on the same device(s) as other applets/programs for different process control systems. The delivery applet 362 includes documentation to inform the user, for example, that the applet 362 needs file/folder add/edit access to a particular folder on the user computer. In an example, the delivery applet 362 may be in use for more than one instance. For example, both a customer user and a service person may download and use the same applet in their respective computers. In an example, the delivery applet 362 provides a user with a simple interface with a get update and/or test button, for example. The applet 362 may also generate a user-readable log file and/or other record indicating success of failure for server access, file writing, installation, etc.

In an example, upgrade/update installation help messages are delivered to the user's computer 340, 350 along with the files 312 for the upgrade and/or update. User maintenance work orders may be initiated using the installation messages as well. Additional files 312 delivered may include updates and/or upgrades for device managers and snap-ons, device description ("DD") files, electronic device description ("EDD") files, etc.

Figure 4:
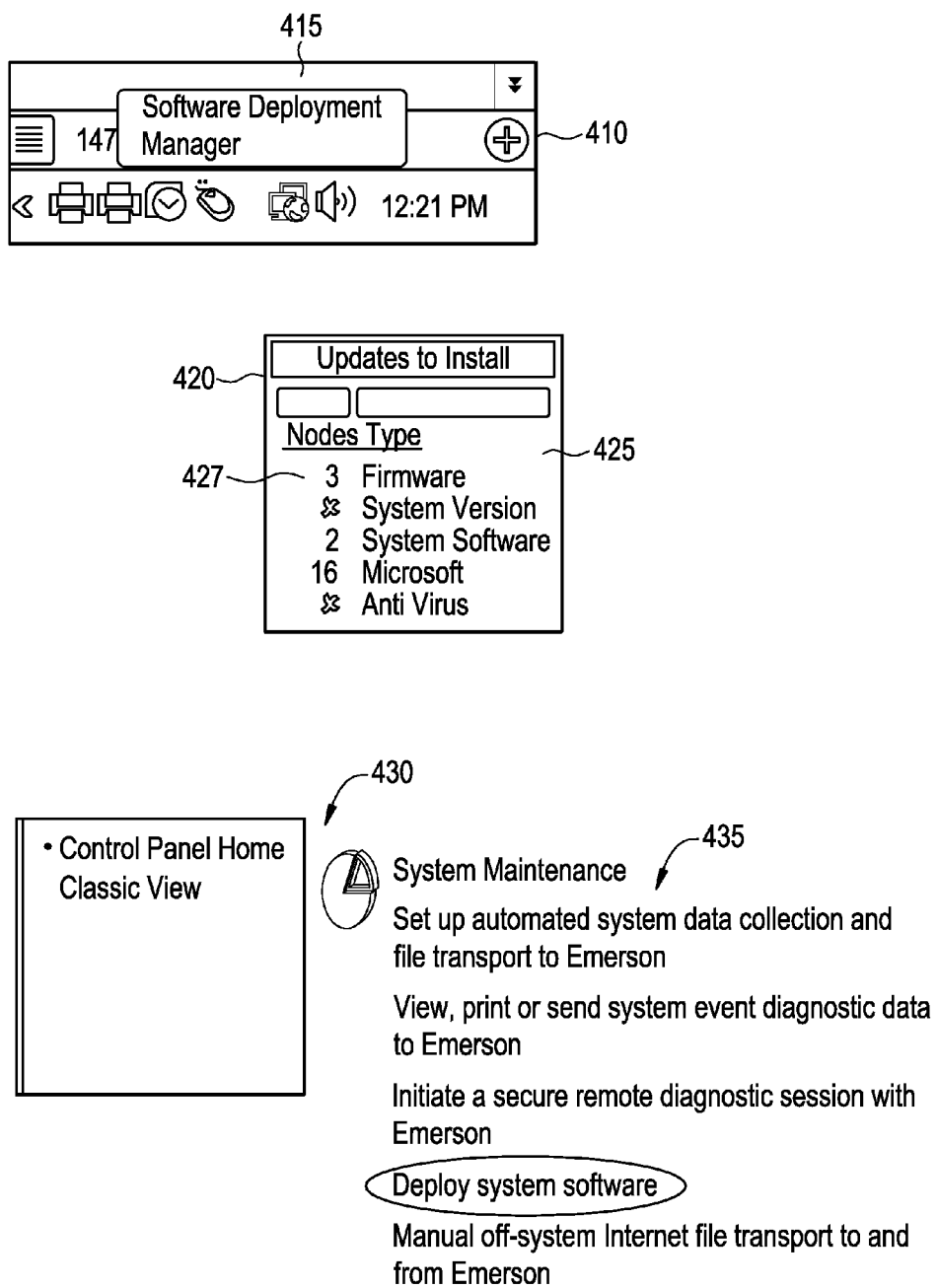
FIG. 4 is a graphical user interface for an example deployment application that may be used to display software update/upgrade deployment options.

A user can log-in or otherwise access a workstation in communication with a process control system to deploy updates and/or additional system software. As shown, for example, in FIG. 4, a deployment application can be accessed from a variety of locations via a workstation or user interface. In some example configurations, a user must have administrator privileges. For example, the deployment application can be accessed from a system tray 410, a sidebar 420, and/or a control panel 430.

The system tray 410 may include a button, icon, link, and/or other indicator to a software deployment manager 415. Selection of the indicator 415 launches an interface for the software deployment manager for the user.

The sidebar 420 may be part of an interface or other display for user review and interaction with the control system, for example. The sidebar 420 lists one or more update or upgrade types 425 and a number of nodes 427 in the system affected by the update/upgrade. For example, software update/upgrade types 425 may include firmware updates/upgrades, system version upgrades, system software updates/upgrades, Microsoft® software updates/upgrades, anti-virus software update/upgrades, etc.

The control panel 430 may be part of an automation system control panel and/or may be a separate control panel for system maintenance and/or software deployment, for example. As shown, for example, in FIG. 4, the control panel 430 may include a plurality of options 435 for user selection and configuration including setup for automated system data collection and file transport, output of system event diagnostic data, secure remote diagnostic session initiation, system software deployment, manual off-system Internet transport, etc. A user can select a software deployment option 435 to configure and/or initiate upgrade and/or update deployment, for example. In certain configurations, the user may also be able to initiate original application installation as well as subsequent update and/or upgrade, for example.

In certain examples, including but not limited to those discussed above, a software deployment manager accessible from a user system facilitates delivery of files to a user's computer rather than the user manually pulling down (e.g., downloading) files from a website. In certain examples, the deployment manager (e.g., the deployment manager 360 of FIG. 3) identifies eligible computer(s) and/or other processing device(s), identifies relevant file(s), and performs deployment of the file(s) to the target computer(s) and/or other processing device(s).

As discussed above, a software program, such as an applet, a portion of program code, and/or other executable code or software periodically checks to determine if an update and/or upgrade is available and applicable to be downloaded. As discussed above, an update fixes a bug and/or improves upon existing software (e.g., updating from version 1.8 to 1.9), while an upgrade provides a new and improved version (e.g., upgrading from version 1 to version 2). In some examples, different files and documentation accompany updates versus upgrades. However, the deployment system treats both updates and upgrades similarly. Upgrades may include a larger amount of software code to be distributed, whereas updates may be delivered on a smaller scale through a software delivery service to process control system components.

In some examples, a user can configure software deployment to be as automated or as user-corrected as possible in some or all aspects of monitoring, retrieval, and deployment. An interface may allow a user to select a degree or extent of automation for different tasks and/or types/sources of data, for example. A user may provide for automated download, automated installation, etc. for one or more types and/or sources of data, for example. A user may automate download of updates and upgrades but manually trigger installation, or vice versa (or may automate both parts of the process). A user may specify options on a computer-by-computer basis, for groups of computers and/or other processing devices, for an entire network or system, etc. For example, a user may select a lead set of machines to automatically install and test updates, and may then install the update on the remainder of machines later after reviewing how the first group of machines functions with the update.

In some examples, a deployment manager integrates a KBA viewer into the deployment manager interface. A user may review what will change when they are ready to implement the change through an update or upgrade. In contrast, a user may access one website to read materials on an update and then accesses a different provider to install the update.

The software deployment manager described herein may operate in conjunction with a process control system including software layered on hardware. The deployment manager may be integrated to provide additional options within a process control system control panel interface, for example.

General updates may provide a "one size fits all" approach. However, in certain examples, an update/upgrade is performed on a process control system with knowledge of what components are in the system and how the system is configured In this case, update(s) and/or upgrade(s) are then selected based on the particular process control system (e.g., certain controllers, certain products, etc.) and only the implicated update(s)/upgrade(s) that have been tested with the present system components are provided to avoid a disruption to the system. For example, inappropriate updates are avoided to help ensure that a disruption does not occur (e.g., a shutdown or failure of process control system components due to an incompatible update in system software).

As described above, a software deployment manager application may be used for, among other things, update/upgrade deployment, deployment group setup, and review of deployment history. An update deployment view or display provides visibility to hardware with pending updates. This view may similarly provide information regarding upgrades. This view provides warning indicators for reboot or service disruptions and provides an ability to deploy en-mass or to select devices for deployment to help accommodate ongoing operations. Updates and/or upgrades may also be dismissed and/or deferred to a later time.

A deployment group setup view may be an optional view provided for more experienced users. System hardware may be grouped to assign different schedules and degrees of update/upgrade automation. Groups may also be formed to implement update/upgrade deployment strategies where some parts of the system are updated/upgraded first to confirm results in less sensitive process areas. Groups may also be formed where some parts of the system are managed by different people, for example.

A deployment history view provides a history of update/upgrade deployments. This view also provides visibility to dismissed and/or deferred updates/upgrades and provides an ability to reactivate and/or reschedule them, for example.

Figure 5:
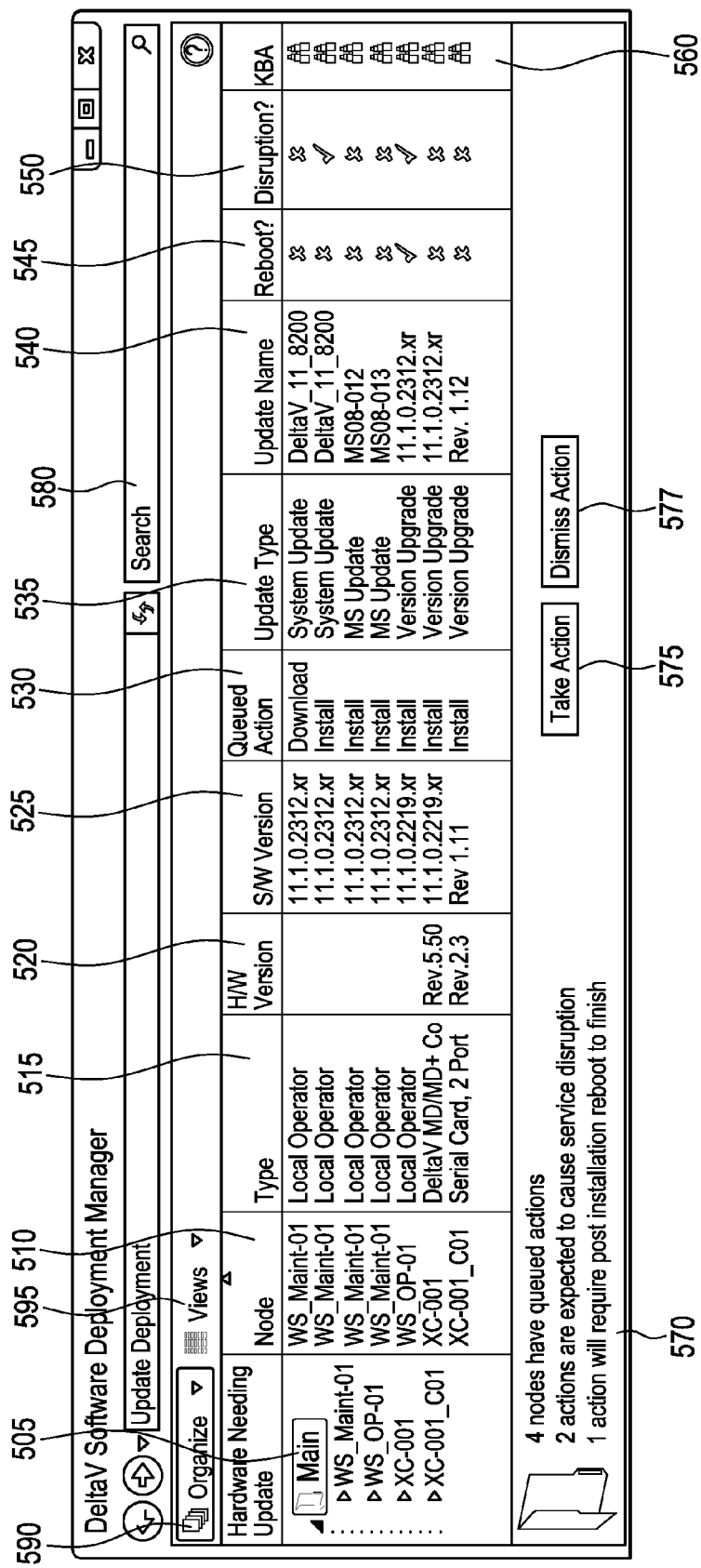
FIG. 5 is a graphical user interface for an example deployment interface of a software deployment manager to provide a list of hardware with pending updates.

As illustrated, for example, in FIG. 5, an update deployment interface 500 of the software deployment manager described herein (e.g., the deployment manager 360 of FIG. 3) provides a list of hardware with pending updates 505. The deployment interface 500 provides an explorer-based display and hierarchy that allow taking action or dismissing action against a deployment group, individual nodes, and/or individual queued updates (and/or upgrades) for a node.

Using the interface 500, a user may select an update 505 and view which node(s) 510 include the hardware affected by the update. The user may also see a type 515 of hardware involved, as well as a hardware version 520 and a software version 525. The deployment interface 500 provides a list of queued action(s) 530 for an update, such as download or install, as well as a type 535 for the update (e.g., control system update, operating system update, version upgrade, etc.). An update name 540 is also provided along with an indication of whether an update will result in a system reboot 545 and/or a system operation disruption 550, for example.

The interface 500 also provides a summary 570 of update information, such as a number of nodes having queued actions along with how many of those actions are expected to cause service disruption and/or require post installation reboot to finish. The interface 500 also includes action buttons to initiate or take a selected action 575 or to dismiss a selected action 577.

When the "Take Action" button 575 is selected, the deployment application starts the queued download or install action. Affected row(s) are removed from the deployment interface 500 and are added to a history view as requested item(s). When the "Dismiss Action" button 577 is selected, the user may set a date for the queued action to reappear in the deployment interface 500 and may optionally enter a textual note regarding the action. In an example, a modal popup may be used to enter the node and/or a bar at the bottom of the interface 500 can be used for note entry and display. A dismissed item is removed from the deployment interface 500 and added as a dismissed item in the software update history view.

Take action 575 and dismiss action 577 may act on results of a search via a search input area 580 in the interface 500. For example, a user may query for a particular update name and/or device type to act or dismiss regardless of deployment group.

The reboot column 545 indicates whether a post-installation reboot of a workstation is required to complete the installation. The disruption column 550 indicates whether there is a possibility of an interruption in the operation of an affected device or accessibility during the time that installation is underway. For example, a simplex controller may become momentarily unavailable during the installation of a hot fix. As another example, a Microsoft-related update may force the closure of any open Internet Explorer® windows.

An icon or indicator in a KBA column 560 provides a modal pop-up window displaying a KBA document related to the update, including relevant details for disruption and reboot items. In the case of version upgrades, release notes may be presented. In an example, a KBA article identification number and name associated with the update/upgrade may be displayed as a hyperlink to enable users to retrieve a knowledge base article of interest related to the software/firmware update or upgrade.

The interface 500 also provides functionality to organize 590 information displayed and/or views 595 to select among various options and/or ways of displaying available information, for example.

Figure 6:
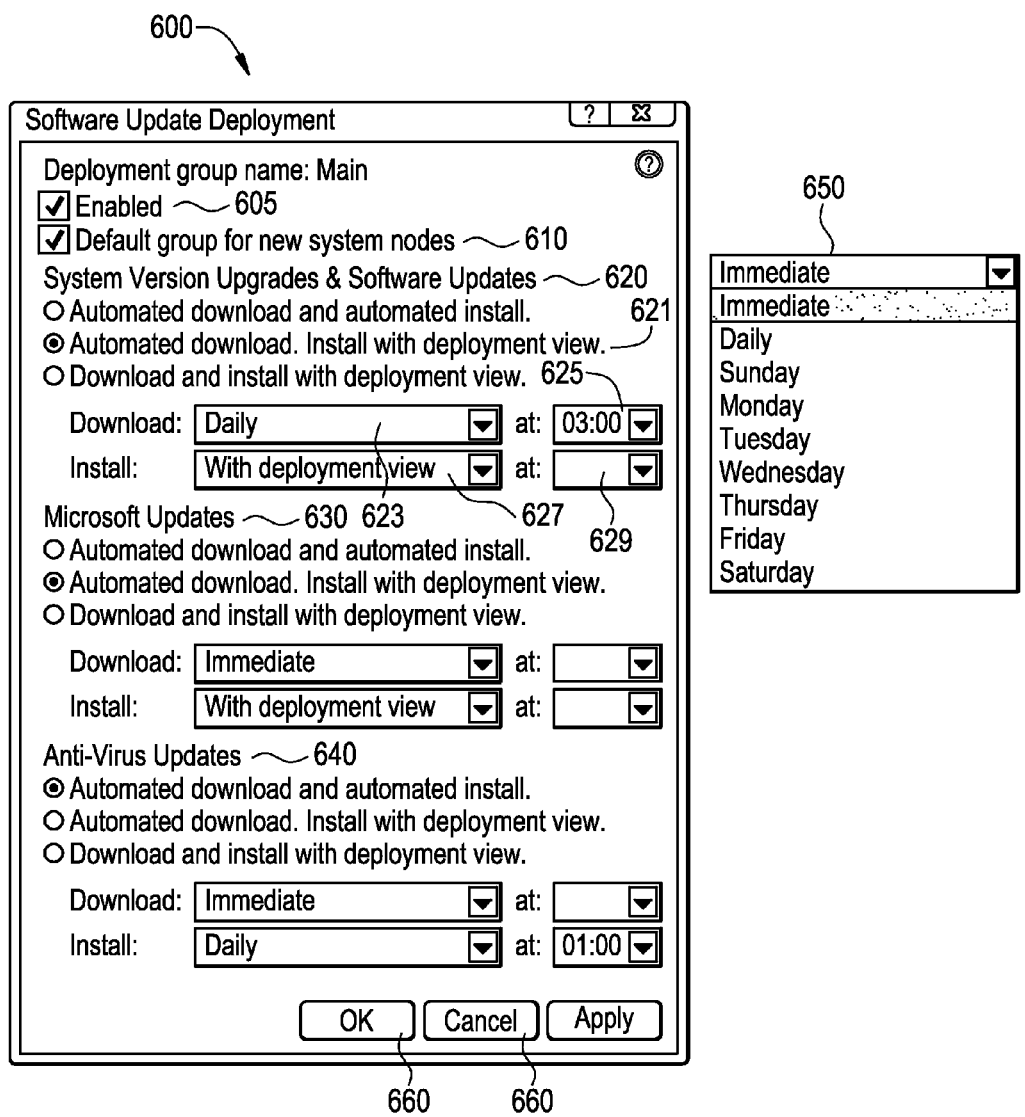
FIG. 6 is a graphical user interface showing a default schedule and automation settings for a deployment group.

As delivered, all devices in a process control system are organized in one "main" or default deployment group. A deployment group defines a schedule and degree of update automation for system node(s) assigned to that group. FIG. 6 illustrates a default schedule and automation settings for the main deployment group. If the user creates a new deployment group, the default values and/or options for the new group may be the same as illustrated, for example, except that the two checkboxes shown for "Enabled" 605 and "Default group" 610 are not checked upon creation. All new system hardware is assigned to the deployment group specified as the default group. When a deployment group is disabled, updates/upgrades will not be downloaded or installed in the hardware assigned to that group, and the group (along with its hardware) is removed from the update deployment interface 500. In an example, all groups may be disabled.

As shown, for example, in FIG. 6, deployment group settings 600 may include a variety of options selectable by a user. For example, the group settings 600 may include the checkbox 605 or other selector to enable the group for updates/upgrades. The group settings 600 may include the checkbox 610 or other selector to specify the group as the default group for new system nodes. The settings 600 may also include a variety of options for various types of updates and/or upgrades. For example, options may include system version upgrades and software updates 620, operating system (e.g., Microsoft Windows® updates 630, anti-virus updates 640, etc. For each option, a schedule and degree of update automation may be set for the system nodes assigned to that option. For example, for a system version and software update and/or upgrade 620, a degree of update automation 621 may include 1) automated download and automated install; 2) automated download and install with deployment view; and 3) download and install with deployment view. Download frequency 623 may be set to a certain period 650, such as immediate, daily, Sunday, Monday, Tuesday, Wednesday, Thursday, Friday, Saturday, etc. The download frequency 623 may include a particular time 625 for initiation of software download. An install option 627 may also be set to a certain period as well, such as with deployment view, daily, immediate, a certain day of the week, etc. A time 629 may be set for the install option 627 as well. One or more buttons or other selectors 660 may be used to approve and/or cancel changes, for example.

Figure 7:
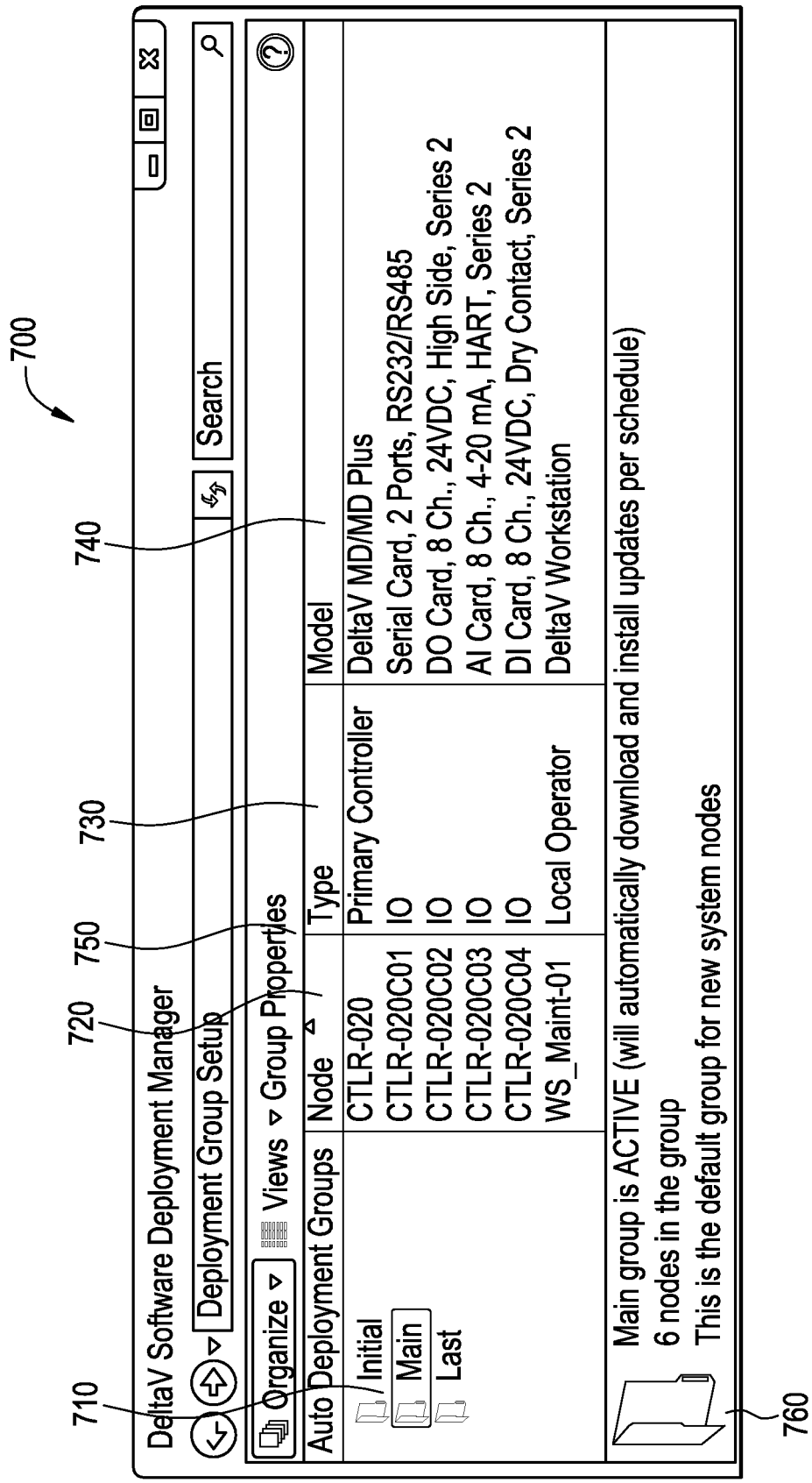
FIG. 7 is a graphical user interface for an example deployment group setup interface configured to display available software deployment groups and constituent node information.

FIG. 7 shows an example deployment group setup interface 700 configured to display available software deployment groups and constituent node information. Deployment groups may be added, deleted, and renamed, for example. In an example, system nodes may be dragged and dropped into deployment group folders. The deployment group setup interface 700 includes a listing of automated deployment groups 710, such as an initial deployment group, a main deployment group, and a last deployment group. For each group 710, the interface 700 displays system node(s) 720 included in the group 710. For each node 720, a type 730 of node is provided (e.g., I/O node, primary controller node, local operator node, etc.). Model information 740 is also provided for each node 720 in the group 710. As an example, selecting a group properties tab 750 or a folder icon 760 may open a software update settings dialog box, such as settings 600, for a selected group 710.

As shown, for example, in FIG. 8, a history of software updates 800 may be shown for user review. The history interface 800 includes a listing of node group(s) 810 with an update/upgrade history for display. The node groups 810 may be divided among groups such as workstations, controllers, I/O, etc. For each node group 810, the history interface 800 displays a listing of constituent nodes 820, update times 830, update type 840, an action/result of the update 850, an update mechanism 860, a dismissal note 870, and a reactivate date 880, for example. That is, for a selected group of nodes the history interface 800 provides a number and identification of nodes involved in an update/upgrade, a date and time of the update/upgrade, a type of update/upgrade, an action and/or other result of the update/upgrade, and an identification of who or what initiated the update/upgrade. If an update and/or upgrade was dismissed for a node, then a dismissal note 870 may be included. A reactivation date 880 on which the update and/or upgrade is to be re-tried or otherwise reactivated may also be provided.

Dismissed items may be edited to reset or clear the reactivation date 880 and/or reset or clear the dismissal note 870, for example. A modal popup or bar may be used for such editing, for example.

As an example, the history interface 800 may provide an update history for a workstation maintenance group 810 including a plurality of workstation maintenance nodes 820. The history interface 800 provides dates and times 830 when a series of updates 840, including operating system and process control system updates were acted upon. The actions/results 850 may include download requested, download confirmed, install requested, install confirmed, dismissed, etc. The history interface 800 may also provide an indication 860 of who or what requested or otherwise triggered the update 840. For example, an update/upgrade may be triggered according to a schedule, by a particular user, by a control system device, etc. If an action 850 indicates a dismissal of an update, for example, the dismissal note 870 may indicate a reason for dismissal, a plan for reactivation, and/or other explanation, for example. If a dismissed update and/or upgrade is to be reactivated, the reactivation date 880 provides a date and time for reactivation of the update/upgrade 840 at one or more nodes 820 in a group 810.

In an example, a user can search for devices in a process control system for which a firmware and/or software update/upgrade is applicable. Search results may be saved for later retrieval and use. A user with sufficient access privilege may open a saved search and update software and/or firmware for some or all of the devices in the saved search.

In an example, a system preference allows a user to specify allocated disk space for updates and/or upgrades. When the allocated space limit is reached, a disk space housekeeping task deletes files in file date order, oldest first, protecting from deletion any file (e.g., update/upgrade binary, update/upgrade metadata, KBA, etc.) currently referenced in an update deployment view.

A sidebar and/or other display graphic provides a count for a number of nodes in the control system that have updates/upgrades waiting to be installed for firmware, system version, system software, operating system, and anti-virus. When a user positions a display cursor over a quantity (e.g., a mouse over), a popup or flyout identifies the node names, for example. In an example, if a user has sufficient access privilege, clicking on or otherwise selecting a quantity opens a deployment application with a focus on the named nodes. Clicking on or otherwise selecting other parts of the graphic may generally open the software deployment application. A bar, such as a colored bar, may represent relative quantities of nodes with and without applicability for an update/upgrade. For example, a green bar may be presented if there are no nodes implicated in an update/upgrade. A yellow bar may represent nodes that involve one or more updates/upgrades, for example.

Figure 9:
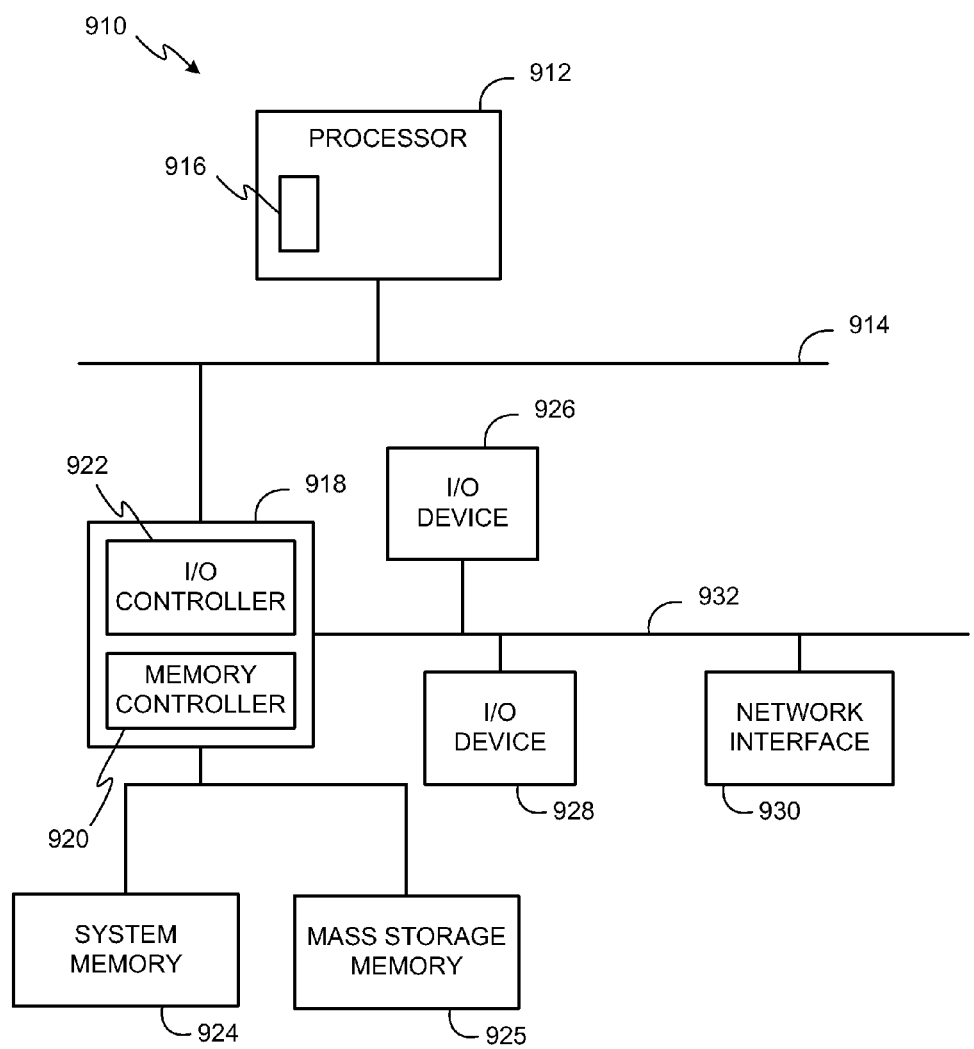
FIG. 9 is a block diagram of an example processor system that may be used to implement the example systems and methods described herein.

FIG. 9 is a block diagram of an example processor system 910 that may be used to implement the example apparatus, methods, and articles of manufacture described herein. As shown in FIG. 9, the processor system 910 includes a processor 912 that is coupled to an interconnection bus 914. The processor 912 includes a register set or register space 916, which is depicted in FIG. 9 as being entirely on-chip, but which could alternatively be located entirely or partially off-chip and directly coupled to the processor 912 via dedicated electrical connections and/or via the interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output ("I/O") controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory ("SRAM"), dynamic random access memory ("DRAM"), flash memory, read-only memory ("ROM"), etc. The mass storage memory 925 may include any desired type of mass storage device including hard disk drives, optical drives, tape storage devices, etc.

The I/O controller 922 performs functions that enable the processor 912 to communicate with peripheral input/output ("I/O") devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode ("ATM") device, an 802.11 device, a DSL modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Figure 10:
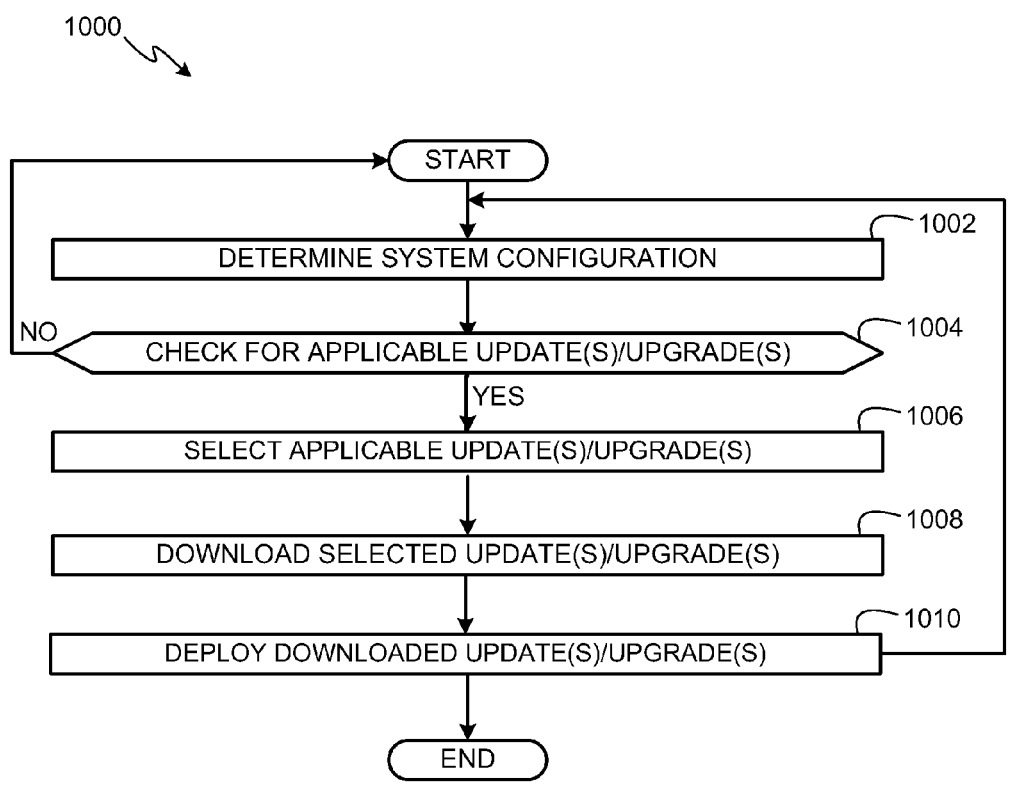
FIG. 10 depicts a flow diagram of an example method that may be used to manage and deploy software updates and/or upgrades to a process control system.

FIG. 10 illustrates a flow diagram of an example method 1000 for automated software update and maintenance deployment management. Automated software update and maintenance deployment can be integrated and/or implemented with a process control system, for example.

At 1002, a system configuration is determined for a process control system. For example, as illustrated in FIG. 3, one or more deployment groups may be configured for components of the process control system 350 using the service management system 310 and the software deployment manager 360. A user may configure a deployment manager (e.g., the software deployment manager 360 of FIG. 3) to be as automated or as user-corrected as desired. A user may configure a certain degree of autonomy in download and deployment. For example, download and/or installation of updates and/or upgrades may be automated. A deployment group may specify download and/or installation parameters for individual computers 340 and/or 350, groups of computing devices, an entire network, etc. A lead or initial group of devices may be identified for a first installation of an update and/or upgrade followed by installation on a main group pending verification of proper installation and operation of the lead group, for example.

At 1004, a repository (e.g., the update files 312, metadata 314, and KBA documents 316 of FIG. 3) is checked for an update and/or upgrade. The deployment manager (e.g., the software deployment manager 360 of FIG. 3) understands the configuration of the control system and checks for updates and/or upgrades applicable to that system configuration. The deployment manager can identify one or more updates and/or upgrades applicable to a configuration of nodes of the process control system.

At 1006, update(s) and/or upgrade(s) applicable to the system configuration are selected. Selection may be automated and/or manual by a user as specified in the system configuration (e.g., using the software deployment manager 360 of FIG. 3 in conjunction with the deployment interface 500 of FIG. 5 and/or the deployment group setting interface 600 of FIG. 6). For example, the deployment manager understands the configuration of the control system and only selects the updates and upgrades for that system configuration. Selected update(s) and/or upgrade(s) can be provided for download to the process control system. Software representing an update and/or upgrade can be provided along with metadata for the software indicating applicability of the software to one or more nodes of the process control system. Selected update(s) and/or upgrades along with associated metadata can be provided for download via a workstation associated with the process control system, for example. For example, as shown in FIG. 3, the delivery applet 362 works with the software delivery manager 360 to provide selected update(s) and/or upgrade(s) and associated metadata for download to the process control system 350.

At 1008, selected update(s) and/or upgrade(s) are downloaded to the process control system. Downloads may occur automatically and/or based on user initiation, for example. Downloads may occur via a network, such as the Internet or a virtual private network ("VPN") or by a dedicated connection, for example. Downloads can occur automatically and/or upon user authorization via a graphical user interface (e.g., the update deployment interface 500 of FIG. 5) displayed to a system operator, for example.

At 1010, downloaded update(s) and/or upgrade(s) are deployed to components of the process control system. For example, a deployment manager (e.g., the software deployment manager 360 of FIG. 3) or agent monitors remotely-located and/or local process control systems and associated equipment and receives, over a network, update files and metadata to automatically deploy updates where identified. For example, automated installation of the update and/or upgrade software to one or more nodes of the process control system (e.g., the control system 350) is facilitated based on the metadata from a workstation in communication with the one or more nodes of the process control system. The deployment manager is programmed to accept and accommodate updates that have service disruption or reboot behaviors and presents options to a customer for installation at the customer's convenience, for example.

In certain embodiments, an interface (e.g., the update deployment interface 500 of FIG. 5) is displayed for user approval of software installation for an update and/or upgrade. The interface can allow a user to select a time for automated installation of the software, such as immediate installation, installation at a scheduled time, postponement for later reconsideration, etc. The interface can also allow a user to approve automated installation of the software to a group of nodes in the process control system, for example. In certain embodiments, the interface can alert the user regarding a process control system service disruption resulting from installation of the software.

One or more of the operations of the method 1000 may be implemented alone or in combination in hardware, firmware, and/or as a set of instructions in software, for example. Certain examples may be provided as a set of instructions residing on a computer-readable medium, such as a memory, hard disk, DVD, or CD, for execution on a general purpose computer or other processing device.

Certain examples may omit one or more of these operations and/or perform the operations in a different order than the order listed. For example, some operations may not be performed in certain examples. As a further example, certain operations may be performed in a different temporal order, including simultaneously, than listed above.

Figure 11:
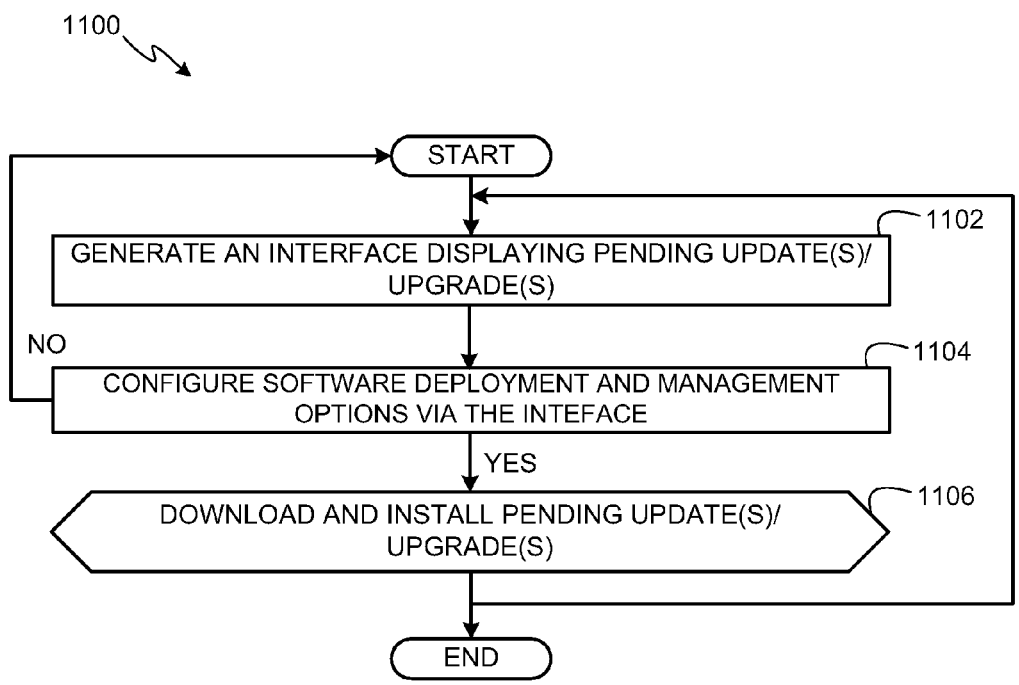
FIG. 11 depicts a flow diagram of another example method that may be used to manage and deploy software updates and/or upgrades to a process control system.

FIG. 11 illustrates a flow diagram of an example method 1100 for automated software update and maintenance deployment management. Automated software update and maintenance deployment can be integrated and/or implemented with a process control system, for example.

At 1102, a graphical user interface (e.g., the update deployment interface 500 of FIG. 5) is generated to display one or more pending software updates and/or upgrades for one or more nodes of a process control system. The one or more pending software updates and upgrades are automatically received from a software delivery service based on a configuration of the process control system.

For example, a repository (e.g., the update files 312, metadata 314, and/or KBA files 316 of FIG. 3) is checked for an update and/or upgrade. A deployment manager (e.g., the software deployment manager 360 of FIG. 3) understands a configuration of the process control system and checks for updates and/or upgrades applicable to that system configuration. The deployment manager can identify one or more updates and/or upgrades applicable to a configuration of nodes of the process control system. Selected update(s) and/or upgrade(s) can be provided for download to the process control system. Software representing an update and/or upgrade can be provided along with metadata and/or other supporting information for the software indicating applicability of the software to one or more nodes of the process control system. Selected update(s) and/or upgrades along with associated metadata can be provided for download via a workstation associated with the process control system, for example.

At 1104, software deployment and management options can be configured via the interface. For example, the interface (e.g., the deployment group setup interface 700 of FIG. 7) can accept user input to configure one or more groups of nodes for the process control system. That is, one or more deployment groups may be configured for components of the process control system. A user can configure a deployment manager to be as automated or as user-corrected as desired. A user may configure a certain degree of autonomy in download and deployment. For example, download and/or installation of updates and/or upgrades may be automated. A deployment group may specify download and/or installation parameters for individual computers, groups of computing devices, an entire network, etc. A lead or initial group of devices may be identified for a first installation of an update and/or upgrade followed by installation on a main group pending verification of proper installation and operation of the lead group, for example. As another example, the interface can accept user input to approve one or more actions regarding the one or more pending software updates and upgrades.

At 1106, downloading and installation of the one or more pending software updates and/or upgrades is facilitated according to user input and process control system configuration. Downloads may occur automatically and/or based on user initiation (e.g., via the deployment interface 500 of FIG. 5), for example. Downloads may occur via a network, such as the Internet or a virtual private network ("VPN") or by a dedicated connection, for example. Downloads may occur automatically and/or upon user authorization via a graphical user interface displayed to a system operator, for example. Automated installation of the update and/or upgrade software to one or more nodes of the process control system may be facilitated based on the metadata from a workstation in communication with the one or more nodes of the process control system, for example. A deployment manager or agent (e.g., the software deployment manager 360 of FIG. 3) may be programmed to accept and accommodate updates that have service disruption or reboot behaviors and presents options and/or alerts to a customer for installation at the customer's convenience, for example. Via the interface (e.g., the deployment interface 500), a user may set a time (including a postponement for reconsideration) for deployment of an update and/or upgrade, for example.

One or more of the operations of the method 1100 may be implemented alone or in combination in hardware, firmware, and/or as a set of instructions in software, for example. Certain examples may be provided as a set of instructions residing on a computer-readable medium, such as a memory, hard disk, DVD, or CD, for execution on a general purpose computer or other processing device.

Certain examples may omit one or more of these operations and/or perform the operations in a different order than the order listed. For example, some operations may not be performed in certain examples. As a further example, certain operations may be performed in a different temporal order, including simultaneously, than listed above.

Certain examples contemplate methods, systems and computer program products on any machine-readable media to implement functionality described above. Certain examples may be implemented using an existing computer processor, or by a special purpose computer processor incorporated for this or another purpose or by a hardwired and/or firmware system, for example.

Certain examples include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such operations.

Examples may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

Figure 12:
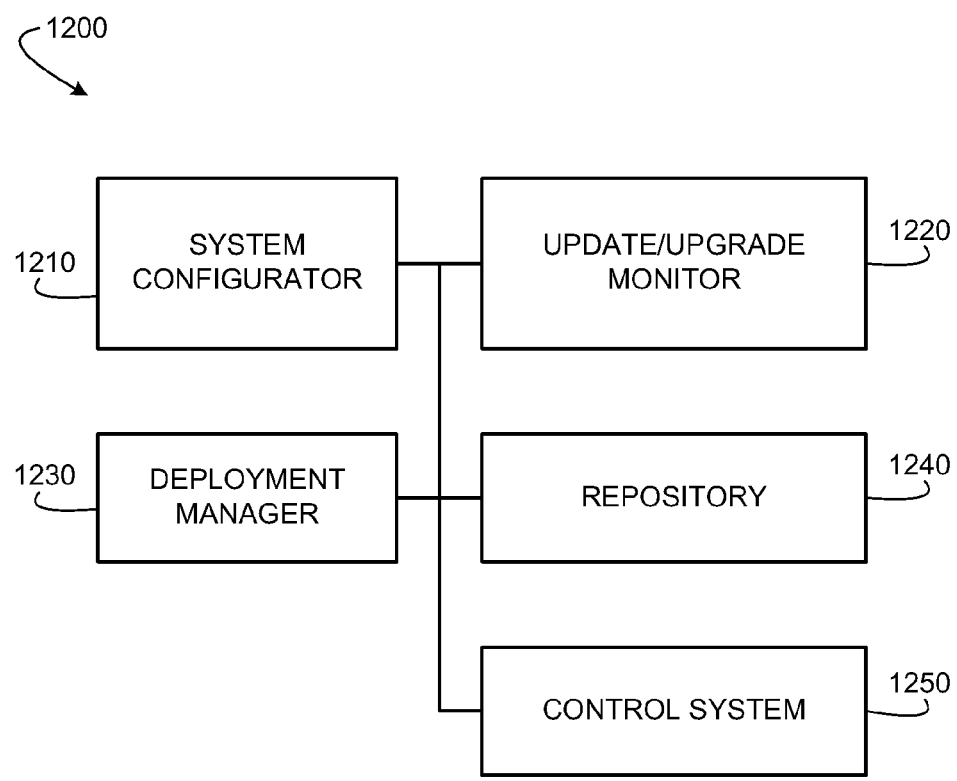
FIG. 12 is a detailed block diagram of an example system that may be used to execute methods and implement systems described herein.

As an example, the methods 1000 and/or 1100 for automated software deployment and management may be implemented in software and/or in hardware as part of and/or in communication with a process control system, such as the process control system 100 described above. Software instructions for executing the methods may be stored on a machine readable medium executable by a computer and/or other processing device, for example. As shown, for example, in FIG. 12, computer program code 1200 including one or more sets of instructions organized as software routines may include a system configurator 1210, an update/upgrade monitor 1220, and a deployment manager 1230, interacting with a repository 1240 of updates and/or upgrades and a control system 1250.

The system configurator 1210 analyzes configuration information and other parameters for the control system 1250. Using the system configurator 1210, software deployment groups, automation options for download and/or installation of updates/upgrades, and/or other user preferences/settings described above may be configured, for example. Configuration information may be established for all or part(s) of the control system 1250. A user may configure software update/upgrade and deployment to be as automated or as user-corrected as desired. A deployment group may specify download and/or installation parameters for individual computers, groups of computing devices, an entire network, etc. A lead or initial group of devices may be identified for a first installation of an update and/or upgrade followed by installation on a main group pending verification of proper installation and operation of the lead group, for example.

The update/upgrade monitor 1220 checks the repository 1240 for an update and/or upgrade. The update/upgrade monitor 1220 receives control system configuration information from the system configurator 1210 and checks for updates and/or upgrades applicable to the configuration. The update/upgrade monitor 1220 alerts the deployment manager 1230 if applicable updates(s) and/or upgrade(s) are found.

The deployment manager 1230 selects update(s) and/or upgrade(s) applicable to the system configuration are selected. Selection may be automated and/or manual by a user as specified in the system configuration. For example, the deployment manager 1230 understands the configuration of the control system and only selects the updates and upgrades for that system configuration. The deployment manager 1230 downloads selected update(s) and/or upgrade(s) to the control system 1250. Downloads may occur automatically and/or based on user initiation, for example. Downloads may occur via a network, such as the Internet or a virtual private network ("VPN") or by a dedicated connection, for example.

The deployment manager 1230 deploys downloaded update(s) and/or upgrade(s) to components of the control system 1250. For example, the deployment manager 1230 monitors remotely-located and/or local process control systems and associated equipment and receives, over a network, update files and metadata to automatically deploy updates where identified. The deployment manager 1230 is programmed or otherwise configured to accept and accommodate updates that have service disruption or reboot behaviors and presents options to a customer for installation at the customer's convenience, for example.

Thus, the deployment manager 1230 may be used in conjunction with the update/upgrade monitor 1220 and the system configurator 1210 to access the repository 1240, identify files applicable to the particular control system 1250 and system configuration, and perform file deployment according to a configured degree of autonomy. The deployment manager 1230, update/upgrade monitor 1220, and/or system configurator 1210 may provide a user interface for interaction with a user. Such an interface may be a Web and/or other network-accessible interface, for example. Software update/upgrade monitoring may be integrated with update/upgrade deployment and system management, for example. In an example, using the deployment manager 1230, a user may update all or part of the control system 1250 from a single workstation within the system 1250.

As an example, an update or upgrade code package is provided with metadata identifying a target computer or group of computers for update/upgrade. Objects provided in the code package may be executed to provide an update and/or upgrade and replace a previous version. As an example, an eXtensible Markup Language ("XML") structure may be used to distribute metadata for software update(s)/upgrade(s).

While the foregoing disclosure has provided certain examples, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims, either literally or under the doctrine of equivalents.

What is claimed is:

1. A computer-implemented method for deployment and management of software updates or upgrades for nodes of a process control system, comprising:
   identifying software for at least one of an update or an upgrade applicable to a first configuration of nodes of the process control system by determining that at least one of preventative maintenance or corrective maintenance is available for a portion of the first configuration of nodes;
   identifying an operating efficiency of a field device in the first configuration of nodes, the operating efficiency corresponding to measurement values of the field device within the process control system;
   providing, for download to the process control system, the software for the update or upgrade and metadata for the software based on a comparison of the operating efficiency to a threshold value;
   identifying, based on the comparison and the metadata, applicability of the software to a second configuration of nodes of the process control system; and
   facilitating, based on applicability of the software to the second configuration of nodes, automated installation of the software to the second configuration of nodes based on the metadata via a workstation in communication with the second configuration of nodes of the process control system.

2. A method as defined in claim 1, wherein providing for download comprises automatically downloading the software to the workstation.

3. A method as defined in claim 1, wherein facilitating automated installation of the software further comprises displaying an interface for user approval of software installation.

4. A method as defined in claim 3, wherein the interface allows a user to select a time for automated installation of the software.

5. A method as defined in claim 3, wherein the interface allows a user to approve automated installation of the software to at least one of the first and second configuration of nodes in the process control system.

6. A method as defined in claim 1, further comprising configuring a desired degree of automation in downloading and installing the software for the second configuration of nodes of the process control system based on user input.

7. A method as defined in claim 1, further comprising grouping the at least one of the first and second configuration of nodes of the process control system according to at least one of an individual node, a set of related nodes, or a network of nodes.

8. A method as defined in claim 7, wherein facilitating automated installation of the software further comprises facilitating automated installation of the software based on the grouping of the at least one of the first and second configuration of nodes.

9. A method as defined in claim 1, further comprising alerting a user regarding a process control system service disruption resulting from installation of the software.

10. A method as defined in claim 1, wherein facilitating automated installation of the software comprises automatically installing the software on the second configuration of nodes of the process control system according to the metadata downloaded with the software.

11. A method as defined in claim 1, wherein at least one of the first and second configuration of nodes include at least one of a controller, a valve, a sensor, or a communication bus.

12. A method as defined in claim 1, wherein the update or upgrade relates to at least one of system security, virus protection, operating system, or digital automation system operation.

13. A method as defined in claim 1, further comprising determining installation results of the at least one of the update or upgrade on a third configuration of nodes; and
    determining that the update or upgrade is available for the portion of the first configuration of nodes based on the installation results,
    wherein a user determines one or more nodes of the third configuration of nodes to install the upgrade or update of the third configuration of nodes, provides for download of the upgrade or update of the third configuration of nodes, and installs the upgrade or update of the third configuration of the nodes.

14. A method as defined in claim 13 wherein contents of the at least one of the update or upgrade applicable to the portion of the first configuration of nodes comprises contents of the at least one of the update or upgrade of the third configuration of nodes.

15. A computer-implemented method, comprising:
    identifying an operating efficiency of one or more field devices of a configuration of nodes of a process control system, the operating efficiency corresponding to measurement values of the one or more field devices within the process control system;
    rendering a first display area via a graphical web-based user interface to display one or more pending software updates and upgrades for the configuration of nodes of the process control system, the one or more pending software updates and upgrades automatically received from a software delivery service based on a comparison of the operating efficiency of one or more field devices of the configuration of nodes to a threshold value;
    accepting user input to configure one or more groups of nodes for the process control system, wherein the one or more groups of nodes includes at least one controller that receives process measurements from the one or more field devices of the process control system;
    accepting user input to approve action regarding the one or more pending software updates and upgrades; and
    facilitating download and installation of the one or more pending software updates and upgrades according to the user input and the configuration of nodes.

16. A method as defined in claim 15, wherein accepting user input to approve action regarding the one or more pending software updates and upgrades allows a user to select a time for automated installation of the software.

17. A method as defined in claim 15, wherein accepting user input to configure one or more groups of nodes for the process control system comprises configuring a desired degree of automation for downloading and installing the one or more pending software updates and upgrades for the configuration of nodes.

18. A method as defined in claim 15, further comprising alerting a user regarding a process control system service disruption resulting from installation of the one or more pending software updates and upgrades.

19. A method as defined in claim 15, wherein facilitating download and installation of the one or more pending software updates and upgrades comprises automatically installing the one or more pending software updates and upgrades on the configuration of nodes according to metadata downloaded with the one or more pending software updates and upgrades.

20. A method as defined in claim 15, wherein the one or more field devices includes at least one of a second controller, a valve, a sensor, or a communication bus.

21. A method as defined in claim 15, wherein the one or more pending software updates and upgrades relates to at least one of system security, virus protection, operating system, or digital automation system operation.

22. An apparatus for deploying software updates or upgrades to nodes in a process control system, comprising:
    a service management system to monitor an operating efficiency corresponding to measurement values of a field device in a configuration of the nodes of the process control system and provide, using a software delivery service, software and supporting information for at least one of an update or an upgrade to the configuration of nodes of the process control system based on a comparison of the operating efficiency to a threshold value and without user initiation, the at least one of the update or the upgrade comprising preventive or corrective maintenance for the configuration of nodes; and
    a software deployment manager at a user-specified destination in the process control system, the software deployment manager including a degree of automation configurable by a user, the software deployment manager to use a knowledge base article matching process that compares information in knowledge base articles for an expected operating efficiency of the field device to the operating efficiency of the field device, the software deployment manager to download and install the software from the software delivery service to the configuration of nodes in the process control system based on the knowledge base article matching process; and
    wherein at least one of the service management system or the software deployment manager comprises a processor.

23. An apparatus as described in claim 22, wherein the supporting information includes metadata for the software indicating applicability of the software to one or more nodes of the configuration of nodes.

24. An apparatus as defined in claim 22, wherein the software deployment manager displays an interface for user approval of at least one of software download and installation.

25. An apparatus as defined in claim 24, wherein the interface allows a user to select a time for automated installation of the software.

26. An apparatus as defined in claim 24, wherein the interface allows a user to approve automated installation of the software to a group of nodes of the configuration of nodes in the process control system.

27. An apparatus as defined in claim 24, wherein the interface allows a user to group one or more nodes of the configuration of nodes according to at least one of an individual node, a set of related nodes, or a network of nodes.

28. An apparatus as defined in claim 27, wherein the software deployment manager facilitates installation of the software based on the grouped nodes.

29. An apparatus as defined in claim 22, wherein the software deployment manager is to alert a user regarding a process control system service disruption resulting from installation of the software.

30. An apparatus as defined in claim 22, wherein the configuration of nodes includes at least one of a controller, a valve, a sensor, or a communication bus.

31. An apparatus as defined in claim 22, wherein the at least one of an update or an upgrade relates to at least one of system security, virus protection, operating system, or digital automation system operation.

32. An apparatus as defined in claim 22, wherein the information in the knowledge base articles comprises database entries that describe issues associated with the configuration of nodes of the process control system and at least one of workarounds, fixes, or other maintenance procedures associated the issues,
wherein the configuration of nodes of the process control system comprises field devices of a digital plant process control architecture.

33. An apparatus as defined in claim 32, wherein the issues associated with the configuration of nodes of the process control system comprise at least one of software bugs, equipment failures, or operating anomalies.

34. A non-transitory machine accessible medium having instructions stored thereon that, when executed, cause a machine to:
identify at least one of an update or an upgrade applicable to a first configuration of nodes of a process control system;
identify operating efficiencies of one or more field devices in the first configuration of nodes, the first configuration of nodes operating in the process control system;
provide, for download to the process control system, software for the at least one of an update or an upgrade and metadata for the software based on a comparison of the operating efficiencies to a threshold value;
identify, based on the comparison and the metadata, applicability of the software to a second configuration of nodes of the process control system, the second configuration of nodes comprising the first configuration of nodes; and
facilitate, based on applicability of the software to the second configuration of nodes, automated installation of the software to the second configuration of nodes of the process control system based on the metadata via a workstation in communication with the second configuration of nodes,
wherein the process control system employs a digital plant process control architecture that integrates at least one of high-speed discrete buses, embedded advanced control, or advanced unit and batch management.

35. A machine accessible medium as defined in claim 34, wherein providing for download comprises automatically downloading the software to the workstation.

36. A machine accessible medium as defined in claim 34, wherein facilitating automated installation of the software comprises displaying an interface for user approval of software installation.

37. A machine accessible medium as defined in claim 36, wherein the interface allows a user to select a time for automated installation of the software.

38. A machine accessible medium as defined in claim 37 wherein the interface allows a user to approve automated installation of the software to a group of nodes in the process control system.

39. A machine accessible medium as defined in claim 34, having instructions stored thereon that, when executed, cause the machine to configure a desired degree of automation in downloading and installing software for the second configuration of nodes of the process control system based on user input.

40. A machine accessible medium as defined in claim 34, having instructions stored thereon that, when executed, cause the machine to group the one or more nodes of the second configuration of nodes according to at least one of an individual node, a set of related nodes, of a network of nodes.

41. A machine accessible medium as defined in claim 40, wherein facilitating automated installation of the software further comprises facilitating automated installation of the software based on grouping one or more nodes of the second configuration of nodes.

42. A machine accessible medium as defined in claim 34, having instructions stored thereon that, when executed, cause the machine to alert a user regarding a process control system service disruption resulting from installation of the software.

43. A machine accessible medium as defined in claim 34, wherein facilitating automated installation of the software comprises automatically installing the software on the one or more nodes of the second configuration of nodes according to the metadata downloaded with the software.

44. A machine accessible medium as defined in claim 34, wherein at least one of the second configuration of nodes includes at least one of a controller, a valve, a sensor, or a communication bus.

45. A machine accessible medium as defined in claim 34, wherein the at least one of the update or the upgrade relate to at least one of system security, virus protection, operating system, or digital automation system operation.

* * * * *